United States Patent
Kim et al.

(10) Patent No.: US 10,045,389 B2
(45) Date of Patent: Aug. 7, 2018

(54) DETERMINING CONNECTIVITY TO A NETWORK DEVICE TO OPTIMIZE PERFORMANCE FOR CONTROLLING OPERATION OF NETWORK DEVICES

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US); Gursharan Sidhu, Moorpark, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 172 days.

(21) Appl. No.: 14/958,704

(22) Filed: Dec. 3, 2015

(65) Prior Publication Data

US 2016/0165650 A1    Jun. 9, 2016

Related U.S. Application Data

(60) Provisional application No. 62/087,760, filed on Dec. 4, 2014.

(51) Int. Cl.
| | |
|---|---|
| *H04W 76/11* | (2018.01) |
| *H04L 12/64* | (2006.01) |
| *H04W 12/06* | (2009.01) |
| *H04W 84/12* | (2009.01) |
| *H04L 29/06* | (2006.01) |

(52) U.S. Cl.
CPC ......... *H04W 76/11* (2018.02); *H04L 12/6418* (2013.01); *H04W 12/06* (2013.01); *H04L 63/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2012/0110100 A1* | 5/2012 | Hiramatsu | H04L 61/2575 709/206 |
| 2012/0178427 A1* | 7/2012 | Paas | H04M 1/72519 455/414.1 |

(Continued)

*Primary Examiner* — Jamal Javaid
*Assistant Examiner* — Saad Khawar
(74) *Attorney, Agent, or Firm* — Kilpatrick Townsend & Stockton LLP

(57) ABSTRACT

Techniques are described for determining connectivity to a network device to optimize performance for controlling operation of one or more network devices. A computing device may determine connectivity to a network device to send a request for information to the network device. The computing device can determine whether it has access to a network (e.g., a wireless network), which includes the network device. The computing device may determine whether it has authorization to communicate with the network device on the network. Authorization may be based on the registration of the network device to communicate with the computing device. When the computing device can access the network and when the computing is authorized to communicate with the network device, communication (e.g., a request) may occur using the network or by direct transmission to the network device. Otherwise, the computing device may communicate with the network device using a remote network.

39 Claims, 15 Drawing Sheets

(56) References Cited

U.S. PATENT DOCUMENTS

| | | | |
|---|---|---|---|
| 2014/0010222 A1* | 1/2014 | Chen | H04W 48/16 370/338 |
| 2014/0282967 A1* | 9/2014 | Maguire | H04W 36/18 726/7 |
| 2016/0245538 A1* | 8/2016 | Amer | H04L 12/2818 |

* cited by examiner

DETERMINING CONNECTIVITY TO A NETWORK DEVICE TO OPTIMIZE PERFORMANCE FOR CONTROLLING OPERATION OF NETWORK DEVICES

CROSS-REFERENCE TO RELATED APPLICATIONS

The present application is claims the benefit and priority of U.S. Provisional Patent Application No. 62/087,760, filed Dec. 4, 2014, entitled "DETERMINING CONNECTIVITY TO A NETWORK DEVICE TO OPTIMIZE PERFORMANCE FOR CONTROLLING OPERATION OF NETWORK DEVICES," the entire contents of which is incorporated herein by reference for all purposes.

TECHNICAL FIELD

The present disclosure relates to network communication. Specifically, techniques are provided for determining connectivity to network devices.

BACKGROUND

People are finding ways to automate operation of devices, such as home appliances. One such way to automate operation of devices has been through use of home automation equipment. Using a network, a device may frequently communicate with home automation devices to synchronize information about status and operation of the device. The device may use multiple networks, sometimes a cellular data network, to communicate with home automation devices that are not physically located where the device is located. Some devices may use alternative networks, e.g., a cellular data network, to reach home automation devices not located within proximity of the device.

Sometimes communication between an access device and a home automation device may encounter delays such that synchronization between those devices may become delayed. Such delays may occur for any number of reasons, such as network latency, network traffic, resource limitations, or the like. Because of such delays, a user's experience in operating the home automation devices using a device may be diminished. For example, home automation devices may not immediately respond to commands or controls when they are initiated via a n access device or may not provide current information to an access device immediately upon request.

BRIEF SUMMARY

The present disclosure relates to determining connectivity to network devices. Specifically, techniques are provided for determining connectivity to a network device to optimize performance for controlling operation of one or more network devices. Such techniques may be beneficial for an access device (e.g., a mobile phone) to choose a communication path to a network device that may improve communication between the access device and the network device. Such improvements in communication between an access device and a network device may include an increase in the rate of communication, an improvement in the efficiency of choosing a more reliable or faster communication protocol, and an increase in the reliability of the communication. By doing so, an access device may receive information (e.g., device information or rules) faster, thereby enabling the access device to reduce time for presenting such information to a user. The improvement in communication to a network device by determining connectivity to the network device may enable the access device to reduce time for communicating information to control operation of the network device. The reduction in time for communication with a network device can improve an overall user experience for controlling network devices from an access device.

In some embodiments, a computing device (e.g., an access device) can determine connectivity to a network device to determine a manner in which to communicate a request for information to the network device. The computing device can determine whether it has access to a network (e.g., a wireless network), which includes the network device. When the computing device cannot access the network, the computing device may communicate with the network device through a remote network. The computing device may also determine whether it has authorization to communicate with the network device on the network. Authorization may be based on the registration of the network device to communicate with the computing device. The computing device may identify a type of request by which to obtain information, e.g., device information or rule information related to operation of network devices. When the computing device can access the network to communicate with the network device and when the computing device is authorized to communicate with the network device, then communication (e.g., a request) can occur with the network device using the network or through direct transmission to the network device. When the computing device does not have access to the network and/or is not authorized to communicate with the network device, then the computing device may communicate with the network device using a remote network (e.g., a cloud network). The remote network may be one by which the computing device and the network device are registered and authorized for communication.

According to at least one example, techniques may be provided to determine connectivity to a network device. Such techniques may be implemented by a computing device (e.g., an access device or a network device). In certain embodiments, the computing device may be included in a mobile computing device (e.g., a mobile phone). The techniques may include performing operations and/or methods. Some embodiments, may include the computing device, which include one or more data processors. The computing device may further include a memory storing instructions that, when executed on the one or more data processors, cause the one or more data processors to perform operations. Some embodiments may include a computer-program product tangibly embodied in a non-transitory machine-readable storage medium of a computing device may be provided. The computer-program product may include instructions configured to cause a data processing apparatus to perform operations and/or methods disclosed herein. The data processing apparatus may include one or more data processors.

In at least one embodiments, a technique may include a computer-implemented method. The method may include detecting, by a computing device, input corresponding to interaction with an interface of the computing device. The method may include determining that the computing device is connected to a network including: a local network including a network device; or a remote network. The local network may comprise a wireless network. The remote network may comprise a network (e.g., a different wireless network or a mobile communication network) that is different from the local network. The method may include, based on determining that the computing device is connected to the local network, sending a message to the network device using the local network. The message may correspond to an operation of the network device. The method may include, based on determining that the computing device is connected to the remote network, sending the message to the network device using the remote network.

In some embodiments, determining that the computing device is connected to the local network includes: determining an identifier associated with the local network; comparing the identifier associated with the local network to a stored identifier associated with the local network, where the stored identifier is stored on the computing device; and determining that the identifier associated with the local network matches the stored identifier associated with the local network.

In some embodiments, determining that the computing device is connected to the local network includes determining that the computing device has authorization to communicate with the network device on the local network. The computing device may have authorization to communicate with the network device on the local network when a security key stored is stored on the computing device and the security key is associated with a network identifier of the local network. Determining that the computing device is connected to the local network may include determining that the computing device has access to the local network. The computing device may have access to the local network when the computing device has established a communication connection to the local network. Determining that the computing device has access to the local network may include determining whether a communication protocol of the computing device supports communication with the network device using the local network.

In some embodiments, determining that the computing device is connected to the network includes: determining an identifier associated with the local network; comparing the identifier associated with the local network to a stored identifier associated with the local network, where the stored identifier is stored on the computing device; and determining whether the identifier associated with the local network matches the stored identifier associated with the local network. Determining that the computing device is connected to the local network may be based on determining that the identifier associated with the local network matches the stored identifier associated with the local network. Determining that the computing device is connected to the remote network may be based on determining that the identifier associated with the local network does not match the stored identifier associated with the local network.

In some embodiments, determining that the computing device is connected to the remote network includes: determining an identifier associated with the local network; comparing the identifier associated with the local network to a stored identifier associated with the local network, where the stored identifier is stored on the computing device; and determining that the identifier associated with the local network does not match the stored identifier associated with the local network. The remote network may include a cloud network in communication with the local network. Sending the message to the network device using the remote network may include sending the message to the cloud network, and the cloud network may send the message received from the computing device to the network device on the local network.

In some embodiments, the message that is sent to the network device using the remote network is generated using a security key, the security key facilitating access to the network device on the local network.

In some embodiments, in response to sending the message to the network device using the local network, receiving a response message from the network device using the local network. The response message may correspond to the operation of the network device. In some embodiments, in response to sending the message to the network device using the remote network, receiving a response message from the network device using the remote network, wherein the response message corresponds to the operation of the network device. The remote network may include a cloud network in communication with the local network. The response message may be received from the network device via the cloud network.

In some embodiments, based on determining that the computing device is connected to the local network and is not connected to the remote network, modifying the interface to display a first indication about the operation of the network device. In some embodiments, based on determining that the computing device is connected to the remote network and is not connected to the local network, modifying the interface to display a second indication about the operation of the network device.

In at least one embodiment, a technique may be implemented by a system. The system may include one or more data processors and a memory storing instructions that, when executed on the one or more data processors, cause the one or more data processors to perform operations. The operations may include detecting input corresponding to interaction with an interface of the computing device. The operations may include determining that the computing device is connected to a network including: a local network including a network device; or a remote network. The operations may include, based on determining that the computing device is connected to the local network, sending a message to the network device using the local network. The message may correspond to an operation of the network device. The operations may include, based on determining that the computing device is connected to the remote network, sending the message to the network device using the remote network.

In at least one embodiment, a technique may be implemented by a computer-program product tangibly embodied in a non-transitory machine-readable storage medium. The computer-program product may include instructions configured to cause a data processing apparatus to perform operations. The operations may include detecting input corresponding to interaction with an interface of the computing device. The operations may include determining that the computing device is connected to a network including: a local network including a network device; or a remote network. The operations may include, based on determining that the computing device is connected to the local network, sending a message to the network device using the local network. The message may correspond to an operation of the network device. The operations may include, based on determining that the computing device is connected to the remote network, sending the message to the network device using the remote network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
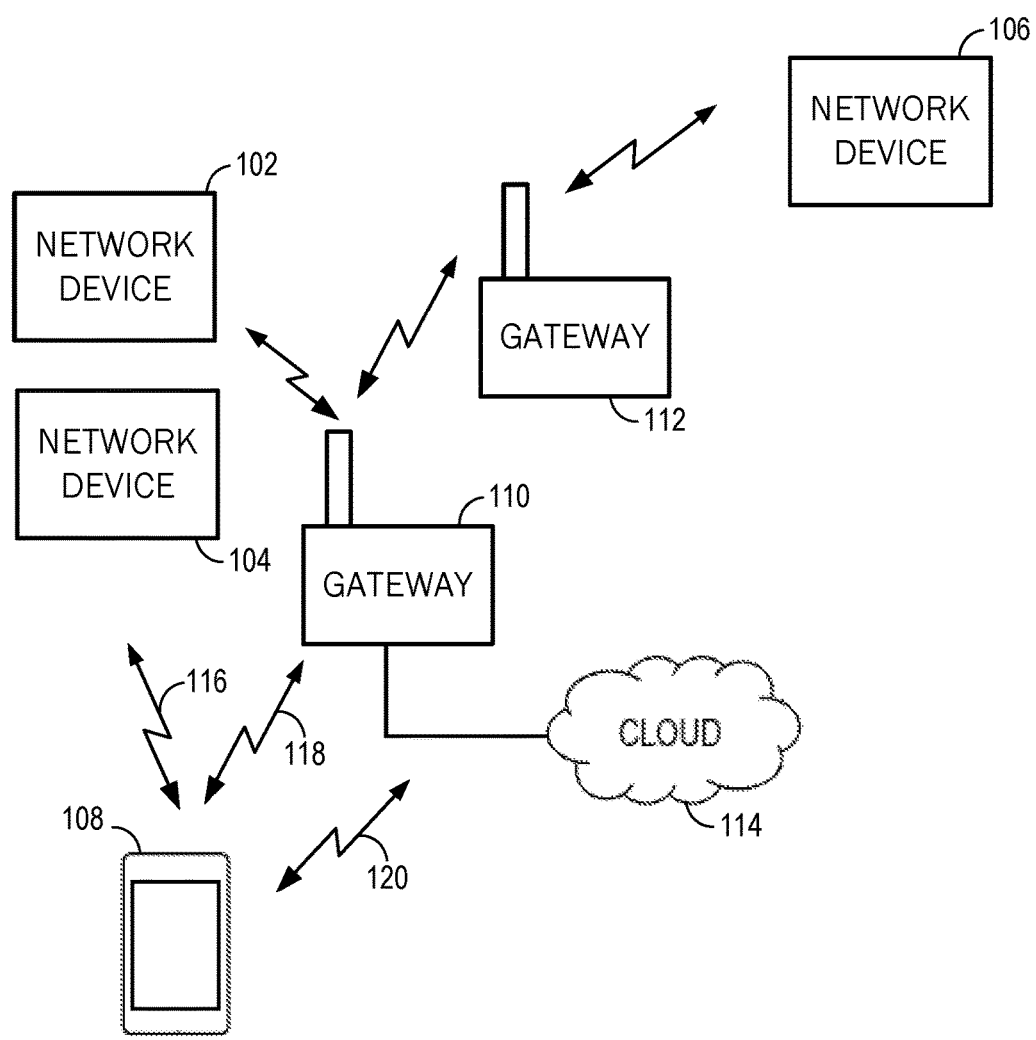
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that allow generation of a single logical network in a local area network, thus preventing multiple logical networks from being associated with the local area network. These techniques allow a user, whether located locally or remotely from the local area network, to access all network devices in the local area network. Techniques are provided for determining connectivity to a network device to optimize performance for controlling operation of one or more network devices. Such techniques may be beneficial for an access device (e.g., a mobile phone) to choose a communication path to a network device that may improve a rate of communication and/or efficiency of communication between the access device and the network device. By doing so, the access device may receive information (e.g., device information or rules) faster, thereby enabling the access device to reduce time for present such information to a user. The improvement in communication to a network device by determining connectivity to the network device may enable the access device to reduce time for communicating information to control operation of the network device. The reduction in time for communication with a network device can improve an overall user experience for controlling network devices from an access device.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, techniques and systems are described herein for determining connectivity to a network device to optimize performance for controlling operation of one or more network devices. In some embodiments, a computing device (e.g., an access device) can determine connectivity to a network device to determine a manner in which to communicate a request for information to the network device. The computing device can determine whether it has access to a network (e.g., a wireless network), which includes the network device. When the computing device cannot access the network, the computing device may communicate with the network device through a remote network. The computing device may also determine whether it has authorization to communicate with the network device on the network. Authorization may be based on the registration of the network device to communicate with the computing device. The computing device may identify a type of request by which to obtain information, e.g., device information or rule information related to operation of network devices. When the computing device can access the network to communicate with the network device and when the computing is authorized to communicate with the network device, then communication (e.g., a request) can occur with the network device using the network or through direct transmission to the network device. When the computing device does not have access to the network and/or is not authorized to communicate with the network device, then the computing device may communicate with the network device using a remote network (e.g., a cloud network). The remote network may be one by which the computing device and the network device are registered for communication.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
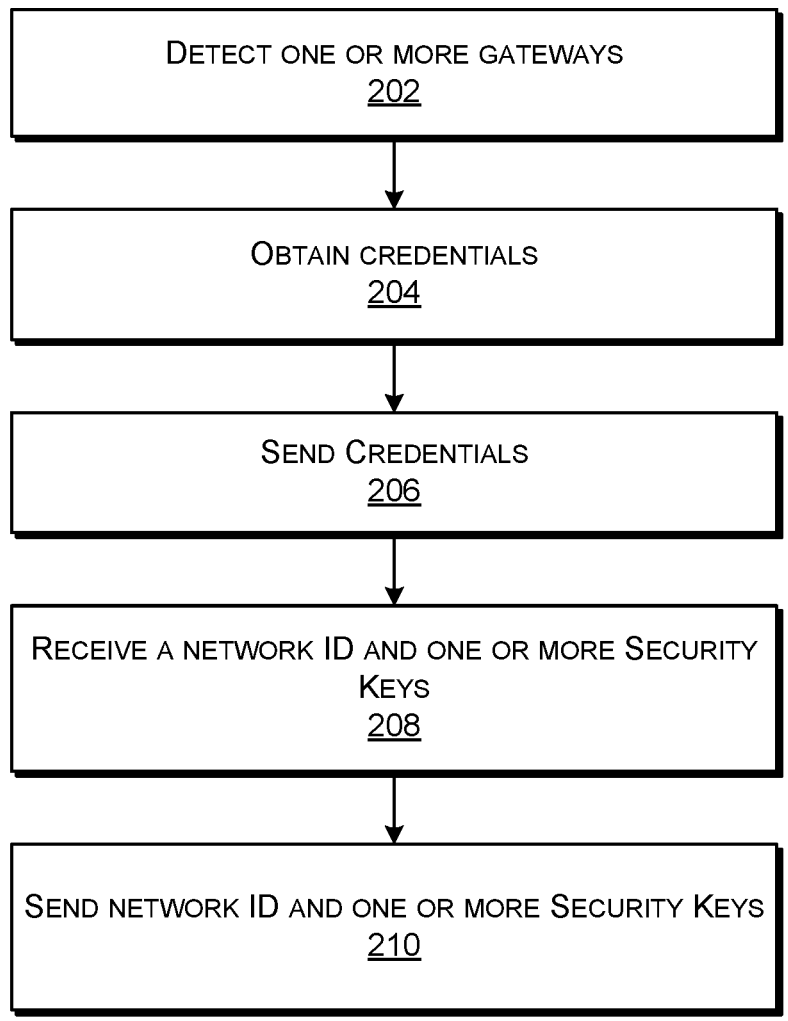
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and Expiration-Time terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
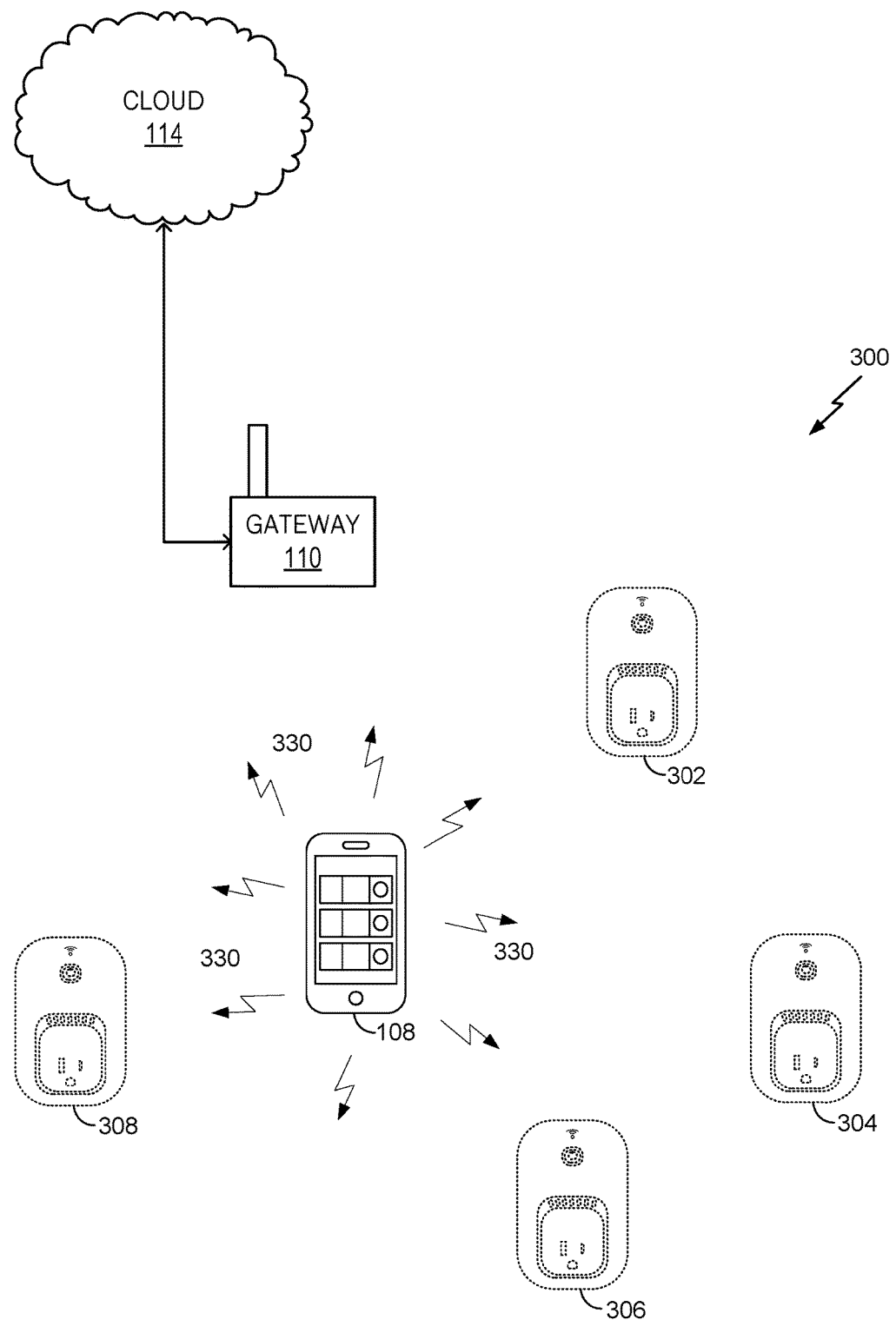
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
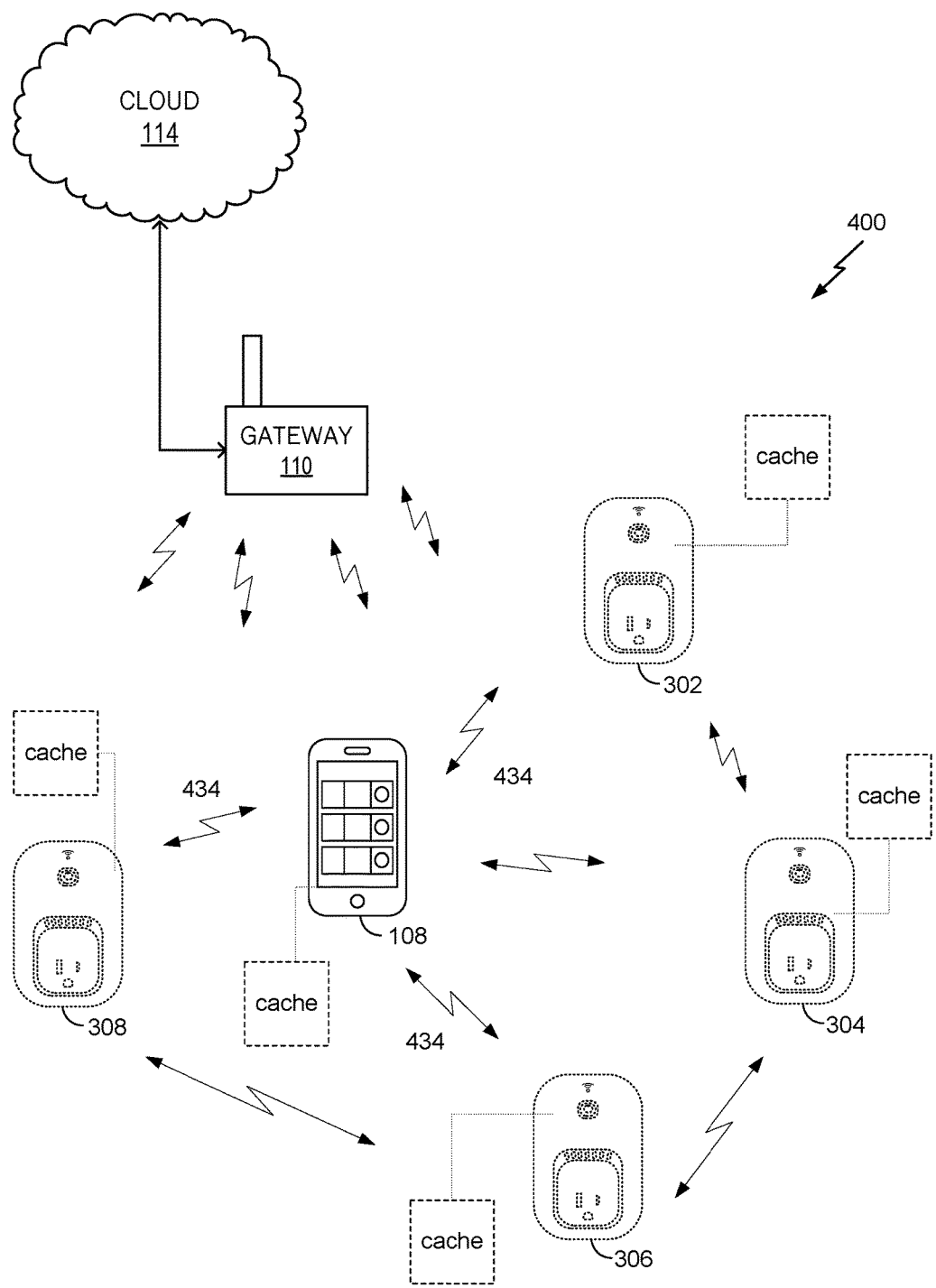
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
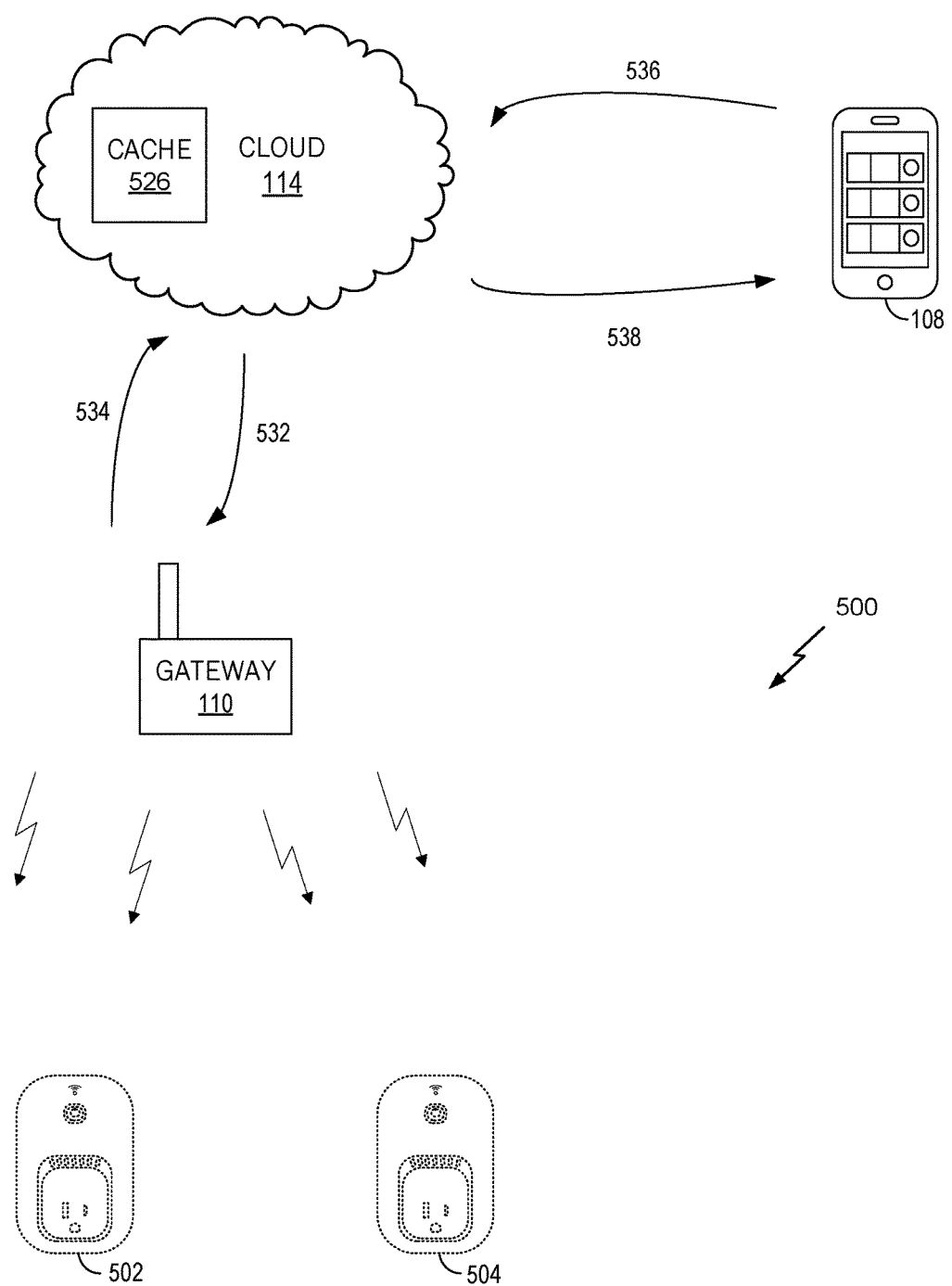
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn, receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
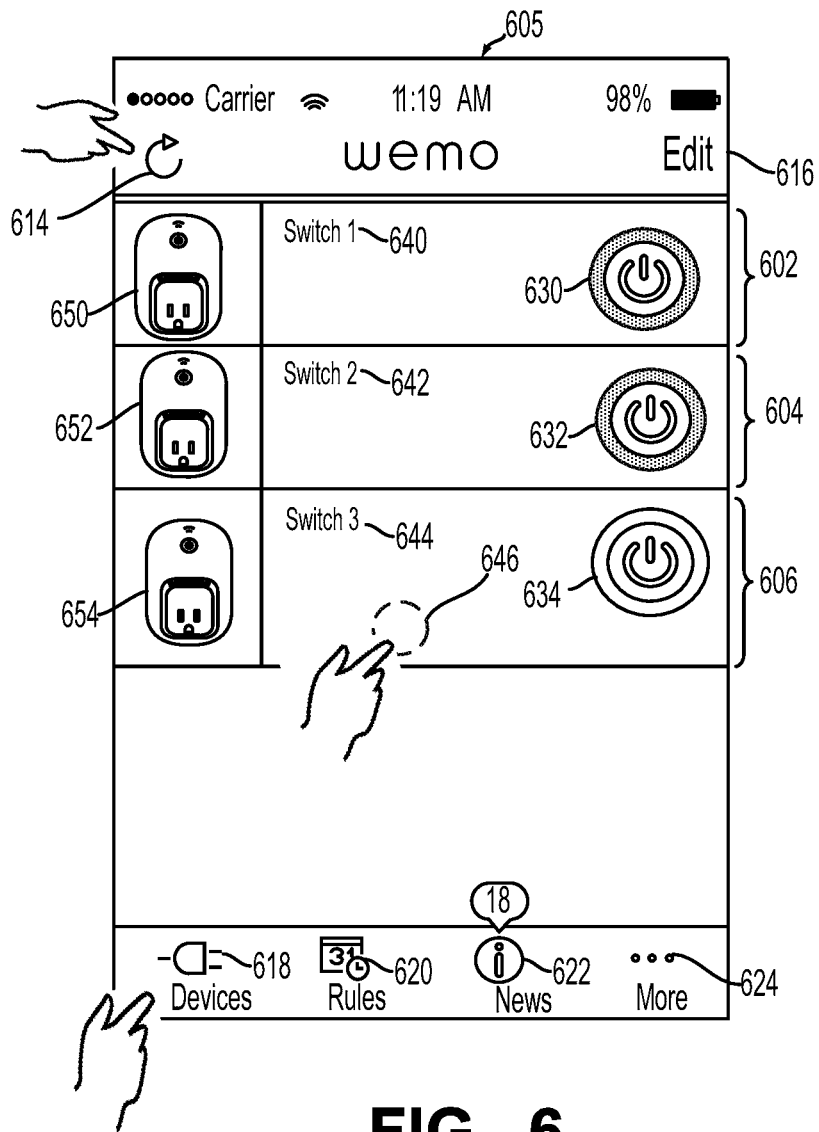
FIG. 6 is an illustration of an interface for managing network devices in accordance with some embodiments.

FIG. 6 is an illustration of an interface 605 for managing network devices in accordance with some embodiments. Interface 605 may be included or implemented in a physical interface of a device (e.g., access device 108). A physical interface may correspond to or include a screen of the device. The physical interface may include one or more interactive elements (e.g., a control or a button) to operate the device. For example, an interactive element may include a power button that, when interacted with, causes the device to turn on or off. One or more interactive elements of the physical interface may cause interface 605 to be presented. All or part of interface 605 may be displayed as part of or in response to execution of an application. For example, interface 605 may be presented when an application is started (e.g., launched). In some embodiments, interface 605 may present other information (e.g., rule information) related to operation of devices.

In some embodiments, interface 605 may display information (e.g., device information) about devices, e.g., any of network devices 302, 304, 306, 308 or any of network device 502, 504. Interface 605 may be displayed by a device, e.g., access device 108. Interface 605 may include or display a graphical interface. Interaction with interface 605 may cause information about network devices to be displayed. For example, interaction with interactive element 618 ("Devices") may cause device information to be presented in interface 605. In some embodiments, interface 605 may present information associated with a network device when the network device is discovered or rediscovered on a network (e.g., local area network 300). As will be described below, interface 605 may be presented based on information stored by a computing device, e.g., a computing device described with reference to FIG. 8.

In some embodiments, information presented in interface 605 may be received from a network device, e.g., network device 302. A computing device that presents interface 605 may request information (e.g., device information) from a network device. The information may be received in response to a request to the network device or may be provided by the network device without sending a request to the network device. The request may be sent to the network device based on one or more criteria. One criterion may include determining whether the computing device has access to the network device via a network. The network may be a local network (e.g., a wireless network), which includes the network device. The network may be a remote network (e.g., a cloud-based network and/or a mobile communication network) that provides access to the local network for communication with network devices on the local network.

Access to a local network that includes one or more network devices may be based on connectivity to the local network. A device (e.g., an access device) that provides interface 605 may communicate with a network device on a local network when the access device has connectivity to the local network. The access device may communicate with the network device on the local network using a remote network when the access device does not have connectivity to the local network. In some embodiments, the access device may communicate with a network device using a remote network and a local network, when connectivity to both types of networks exists. The access device may choose the local network to improve the reliability and speed of communication with the network device. In some embodiments, an access device may communicate with the network device selectively using either or both of the local network and the remote network event when the access device has connectivity to the local network. As described further below, the access device can determine connectivity to a local network based on one or more factors, such as whether the access device is authorized to communicate with the network device using the local network, whether the access device has access to the local network, or whether the access device supports communication using a communication protocol supported by the network device using the local network. A network device may communicate a response to the access device using the same or a different network based on connectivity to the local and/or the remote networks.

In FIG. 6, interface 605 may display modular tiles 602, 604, 606 for interacting with network devices in a network. Modular tile 602, modular tile 604, and modular tile 606 may correspond to network device 302, network device 304, and network device 306, respectively. A modular tile may enable interactions to monitor and/or control operation of a device corresponding to the modular tile. Interaction with a modular tile may enable a user to initiate one or more actions in addition to operating a device corresponding to the modular tile. The additional action(s) may offer enhanced functionality that may not be available from a typical interface (e.g., a graphical interface or physical interface) that enables a user to control operation of a device.

A modular tile may include interactive areas and/or interactive elements to enable interaction with the modular tile. Modular tiles 602, 604, 606 may each include respective icons 650, 652, 654, and respective names 640, 642, 644 corresponding to a network device. For example, modular tile 602 corresponds to network device 302 and includes an interactive element depicted as a power button 630 for turning device 302 on and off. In another example, modular tile 604 corresponds to network device 304 and includes an interactive element depicted as a power button 632 for turning network device 304 on and off. In another example, modular tile 606 corresponds to network device 306 and includes an interactive element depicted as a power button 634 for turning network device 306 on and off.

An interactive element shown as a control (e.g., power button) may be displayed based on a state of the network device corresponding to the control. An appearance of the interactive element may be altered to be visibly illuminated, colored, shaded, bolded, animated, modified to a different shape, or a combination thereof. Although depicted as a corresponding to a single network device, each modular tile may correspond to multiple network devices, or a group of network devices. For purposes of illustration, a modular tile may be described herein as enabling control for operation of a network device. However, in some embodiments, a modular tile may enable control for operation of multiple network devices, some or all of which may be different.

Due to the different in latency of communication with a network device via a local network and a remote network, communication between an access device and a network device may be impacted. As a result, the appearance and/or functionality of an interactive element corresponding to a network device can be affected based on a response to an action requested for a network device. When a request to operate a network device encounters a delay during communication via a remote network, the access device may be unable to provide a user with notice about the status of the request.

To minimize the negative or diminishing effect on user experiences with controlling network devices using the interface 605, an access device can modify the appearance and/or functionality of an interactive element based on determining its connectivity to a network device corresponding to the interactive element. Such techniques may be useful to enable the access device to provide a better indication of a response time, status of a request, or connectivity to a network device.

In one example, when an access device only has connectivity to a network device via a remote network, and not a local network including the network device, the access device can automatically alter the appearance of an interactive element in interface 605 for the network device based on the connectivity. The appearance may provide a user with an indication of the response time for controlling a network device, thereby minimizing the negative user experience based on response time. Upon requesting operation of a network device, the interactive element corresponding to that network device can be modified to show an in progress notification based on the type of connectivity to the network device. For example, when the connectivity to a network device is via a remote network, which may result in a longer communication time, an appearance of an interactive element may indicate a delay or in progress when a request is sent to the network device. In another example, when the connectivity to a network device is only via a local network, an appearance of an interactive element for the network device may indicate a change in status immediately when an operation is requested. Via the local network, response times are shorter, so the access device may anticipate an immediate response. Using techniques described herein, an access device can determine connectivity to a network device via local and/or remote networks so as to determine when and what to indicate as a status of a request based on the connectivity used to access the network device. Because many users demand feedback upon interacting with interface 605, factoring in the type of connectivity to a network device can better enable the access device to provide a more accurate indication of the status of a request to the network device. Known communication characteristics of different types of networks (e.g., a local network or a remote network) can be considered when determining the status to indicate for a network device based on the connectivity to a network device.

In some embodiments, a modular tile may be customizable by developers and/or manufacturers of the corresponding network devices. For, example, name 640 of modular tile 602 is customized to indicate the name of a specific switch (e.g., "Switch 1"). Additionally or alternatively, a modular tile may convey status information about a corresponding network device or network devices, including, but not limited to, a firmware version, a last known firmware update status, status for connectivity to a cloud network, registration status (i.e., an indication that the network device has a key or does not), a primary mode of the network device (i.e., on, off), a secondary mode of the network device (i.e., standby, high, low, eco), other modes of operation, a schedule, a scene that is enabled using the network device, settings (e.g., speed or sensitivity) for the network device, one or more attributes (e.g., brightness) related to operation of the network device, additional actions that have been initiated based on interaction with a modular tile, rules that may be in effect for the network device or related to operation of the network device, or a combination thereof.

Each of modular tiles 602, 604, 606 may be chosen and displayed based on the type and/or capabilities of a network device (e.g., network devices 302-306). Interface 605 may be flexible and may dynamically display the most appropriate modular tile 602 based on an environment in which the application executes. For instance, interface 605 may enable a mechanism in which a user may pre-configure a modular tile to display an appropriate message for a network device.

FIG. 6 shows that interface 605 may include interactive elements (e.g., selectable icons and links) 614, 616, 618, 620, 622, and/or 624 outside of modular tiles 602, 604, 606. For example, refresh icon 614 may be selected to refresh information presented in interface 605, such as, for example, status and state information displayed in modular tiles 602, 604, 606. For instance, one or more of the statuses for each of modular tiles 602, 604, 606, respectively, may be refreshed on an automatic, periodic basis, in addition to being manually updated when refresh icon 614 is interacted with (e.g., selected). In some embodiments, interaction with refresh icon 614 may cause interface 605 to be updated with modular tiles corresponding to network devices identified on a network (e.g., the network 100). A computing device that displays interface 605 may perform discovery of the network devices on a network. In one example, the computing device may receive information from another network device, e.g., gateway 104. Such information may include device information about network devices discovered on a network.

In some embodiments, interface 605 may include an edit link 616. Interaction with edit link 616 may enable one or more of modular tiles 602, 604, 606 to be editable. For example, edit link 616 may be selected to sort or re-order the sequence of modular tiles 602, 604, 606 displayed in interface 605. Upon interaction with edit link 616, one or more of modular tiles 602, 604, 606 may be interacted with to be disabled or removed. Devices icon 618 may be selected to cause interface 605 to be displayed with one or more network devices that are discovered in a network.

In some embodiments, interface 605 may include a rules icon 620. Interaction with rules icon 620 may enable a graphical interface that enables customization of display rules pertaining to the network devices. The graphical interface may provide one or more interactive elements to control one or more rules related to control of the network devices (e.g., network devices 302, 304, 306). In some embodiments, interaction with rules icon 620 may enable a graphical interface to enable a user to configure rules, modes, notifications, additional actions, or combinations thereof. The graphical interface may be presented in interface 605 or may be shown separately from interface 605. An embodiment of such a graphical interface presented upon interaction with rules icon 620 is described with reference to FIG. 7.

In some embodiments, interface 605 may include a news icon 622. Interaction with news icon 622 may enable a graphical interface to be display which presents news including information associated with the network devices and/or the applications. For instance, interaction with news icon 622 may cause a graphical interface to be displayed in the access device to present information related to the network devices controlled via modular tiles 602, 604, 606 and/or information relevant to the application, such as notifications of available tile updates.

In some embodiments, interface 605 may include a more icon 624. Interaction with more icon 624 may provide one or more additional graphical interfaces to enable access to additional features for controlling and/or monitoring the network devices in a network. For example, an additional graphical interface may be displayed to control one or more settings and/or attributes of any network devices connected to a network. In another example, an additional graphical interface may be displayed to configure secondary options to be initiated by an interface used to control a network device.

Figure 8:
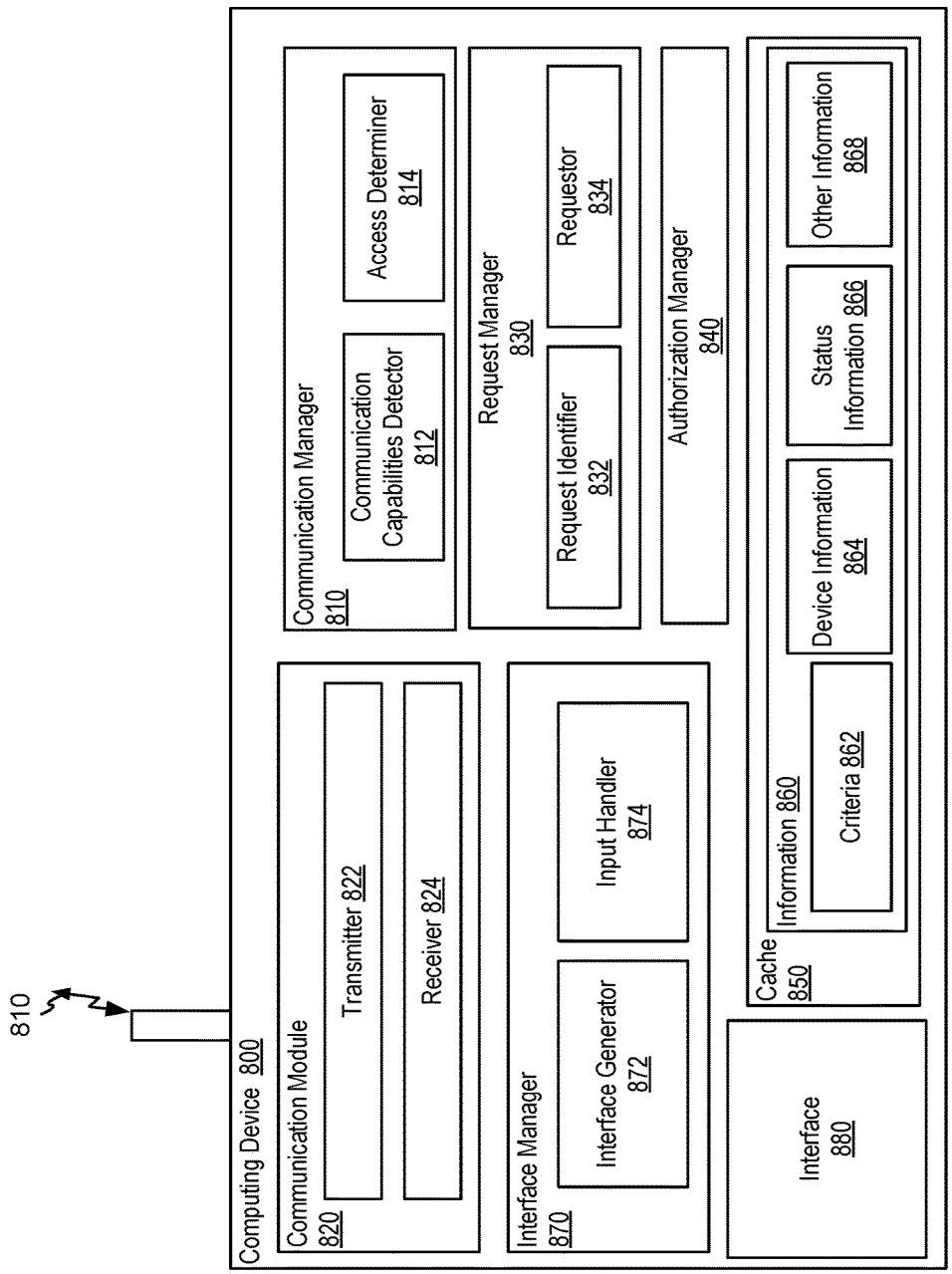
FIG. 8 shows a block diagram of a computing device that determines connectivity to network devices in accordance with some embodiments.
Figure 9:
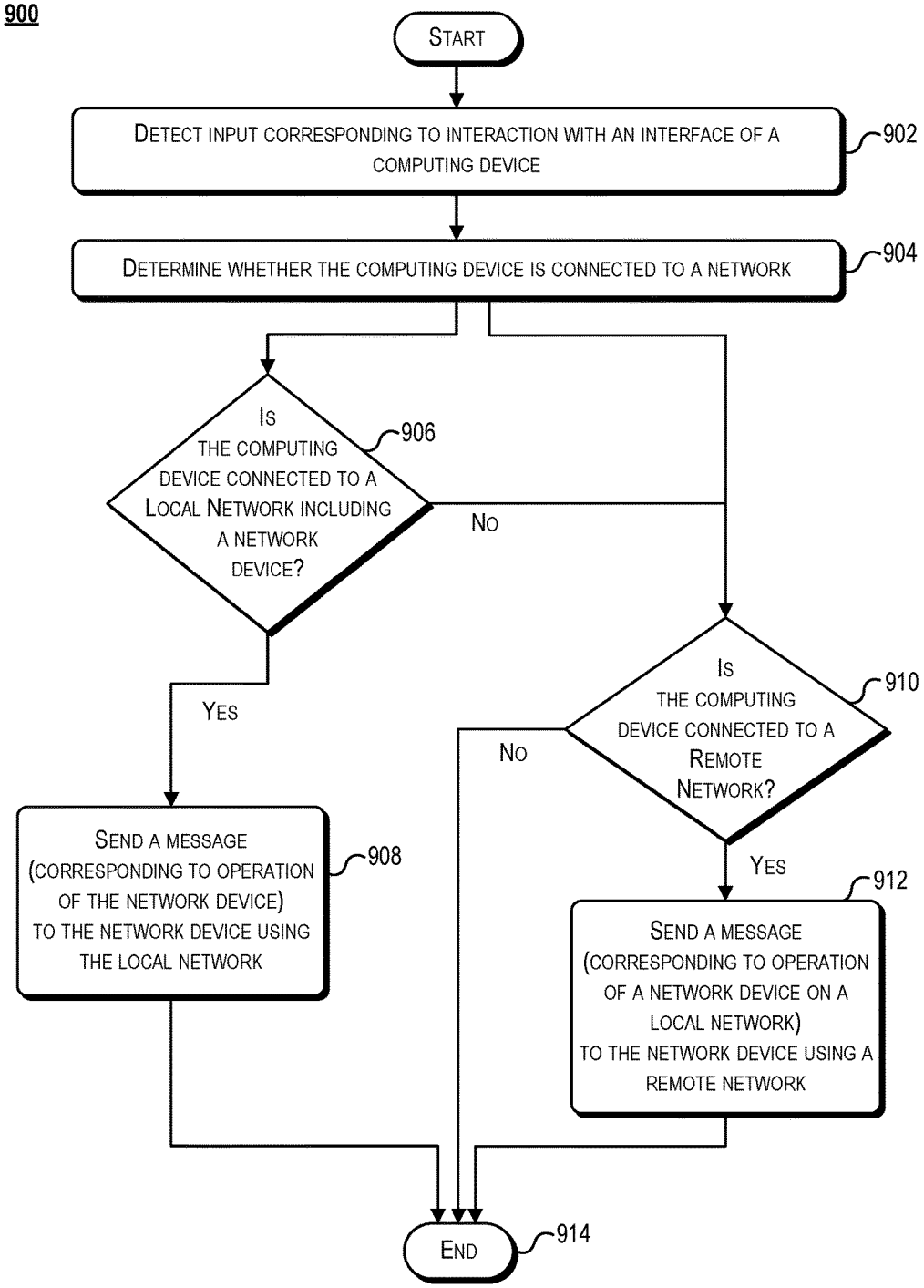
FIGS. 9 and 10 show flowcharts illustrating processes for determining connectivity to network devices in accordance with some embodiments.
Figure 10:
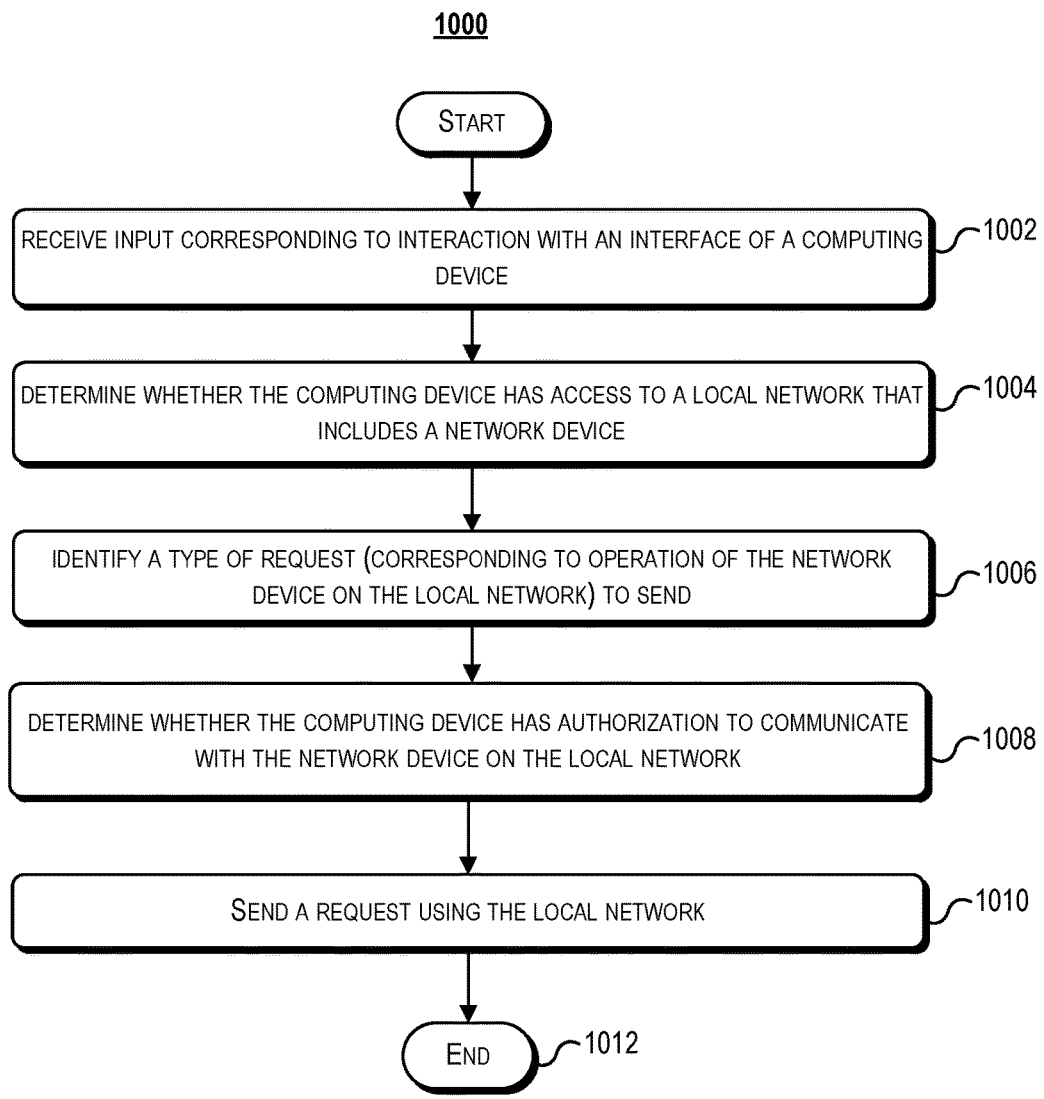

Described below with reference to FIGS. 8-10 are techniques for determining connectivity to network devices. Such techniques may be useful to enable a computing device (e.g., an access device) to optimize performance for controlling operation of the network devices. Performance for controlling operation of network devices may be improved by reducing response time for sending information to a network device to control operation of the network device. Controlling operation of network devices may include presenting information about the network devices in an interface, such as interface 605. As such, the information displayed in interface 605 may enable a user to choose a device to control.

The techniques for determining connectivity to network devices may enable the computing device to determine a faster and/or more efficient communication path to a network device to obtain device information. A faster communication path may enable the information about network devices to be received faster, thereby enabling such information to be presented sooner. A reduction in wait time for device information may enable a user to receive status about network devices. Such an improvement can improve user experience by reducing the time for a user to be presented with status information used to decide how to control a network device.

Figure 7:
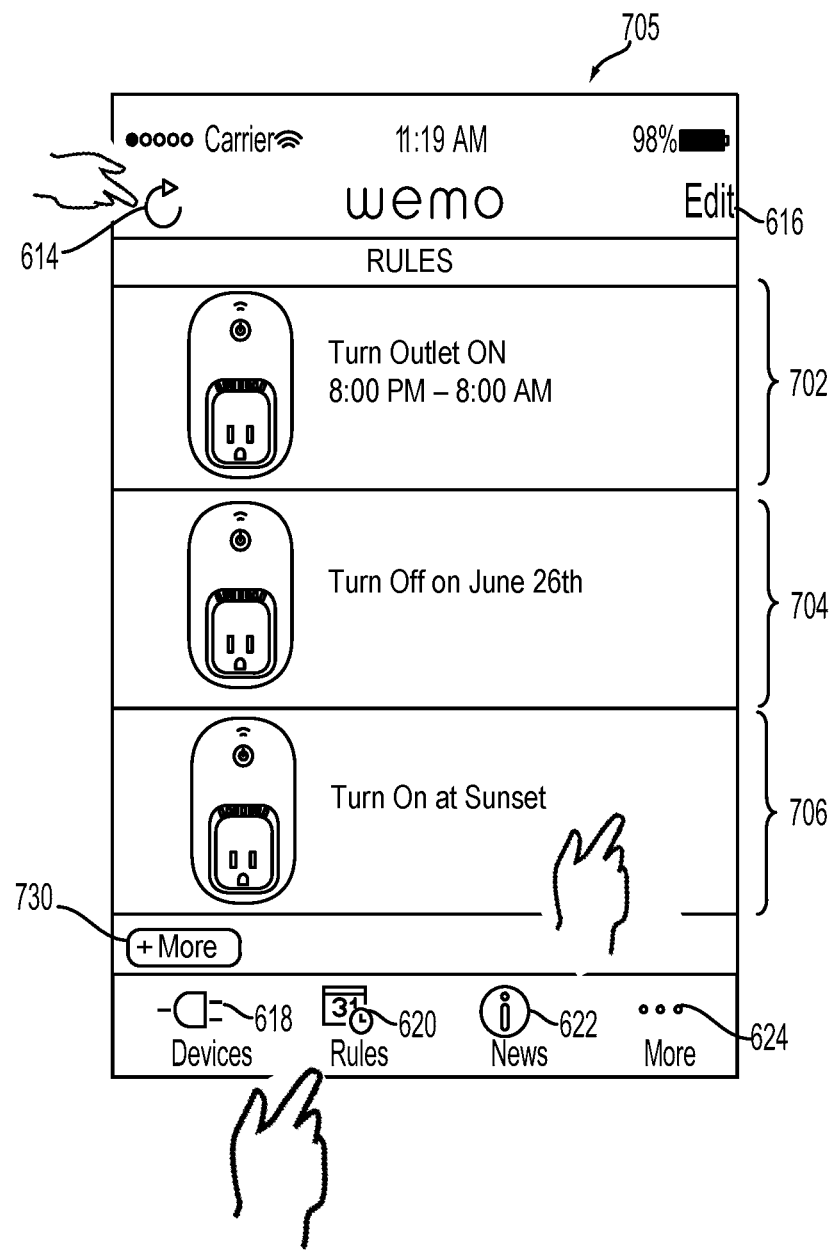
FIG. 7 is an illustration of an interface for managing rules for controlling operation of network devices in accordance with some embodiments.

FIG. 7 is an illustration of an interface 705 for displaying rules for controlling operation of network devices in accordance with some embodiments. Interface 705 may be displayed by a device, e.g., access device 108. Interface 705 may include or display a graphical interface. Interface 705 may include references to elements described with reference to FIG. 6.

In the example shown in FIG. 7, interface 705 may be presented in response to interaction with interactive element 620. Interface 705 may present rules information associated with one or more network devices, e.g., any of network devices 302, 304, 306, 308 or any of network device 502, 504. Interface 705 may be presented as part of an application. Interface 705 may be presented when an application is started.

In some embodiments, interface 705 may present information associated with a network device when the network device is discovered on a network (e.g., the local area network 300). In some embodiments, the information may be presented in interface 705 upon receiving input indicating interaction with the interactive element 620 ("Rules"). As will be described below, interface 705 may be presented based on information received from a computing device, such as a computing device described with reference to FIG. 8. The information presented in interface 705 may be stored by the computing device. The computing device may provide the information in response to a request by access device 108. In doing so, the computing device may reduce communication time for the access device to receive current information, thereby enabling the access device to improve responsiveness for presenting the rule information associated with network devices in interface 705.

In certain embodiments, interface 705 may present one or more graphical interfaces with information indicating one or more criteria (e.g., a rule) related to operation of one or more devices. For example, interface 705 may display modular tiles 702, 704, 706, each corresponding to a one or more criteria related to operation of one or more network devices. For example, each of modular tiles 702, 704, 706 may correspond to one or more rules related to operation of one or more network devices. In some embodiments, a modular tile may correspond to a rule related to operation of a group of network devices. Modular tile 702, modular tile 704, and modular tile 706 may each correspond to a rule for operation network device 302, network device 304, and network device 306, respectively. For example, modular tile 702 may display one or more criteria indicating that network device 302 is scheduled to be operated (e.g., powered on) between 8 am and 8 pm daily. In another example, the modular tile 704 may display one or more criteria indicating that network device 304 is to be operated (e.g., powered on) on a particular date (e.g., July $26^{th}$). In another example, modular tile 706 may display one or more criteria indicating that network device 306 is to be turned on at sunset. In some embodiments, a modular tile may be interactive to enable it to be moved in relation to another modular tile. In such instances, a rule corresponding to each modular tile may be joined to form a new rule based on the rules of each modular tile that is combined.

In some embodiments, a modular tile, such as any one of modular tiles 702, 704, 706 may be interactive such that interaction with the modular tile may cause another graphical interface to be displayed. The graphical interface may present information about a rule corresponding to the modular tile. In some embodiments, the graphical interface may include one or more interactive elements to edit or remove a rule corresponding to the modular tile.

The information (e.g., a rule) presented in any of modular tiles 702, 704, 706 may be determined based on information stored by the access device. Updates to information presented in a modular tile may be received by a computing device described with reference to FIG. 8. Each of modular tiles 702, 704, 706 may be updated or deleted and new modular tiles may be added based on updates to rules stored by the computing device. In some embodiments, interface 705 may include interactive elements to configure a rule corresponding to each of the modular tiles 702, 704, 706. Interface 705 may include interactive elements to create new rules.

In some embodiments, a device that displays interface 705 may determine connectivity to a network device corresponding to one or more rules to be presented in interface 705. The device may determine connectivity to a network device to improve optimization for controlling operation of the network device. Connectivity may be determined by implementing techniques such as those described above and those described further below. For example, the device may determine connectivity to a network device to obtain rules information for operation of network devices. By determining the connectivity to the network device, the device may improve response time for receiving rule information. Such an improvement may enable the device to improve response time for controlling operation of devices based on the rule information.

In some embodiments, interface 750 may include an interactive element 730 (e.g., "More"), which causes interface 750 to present information about one or more additional rules. The information about an additional rule may be displayed using a modular tile as described herein.

Now turning to FIG. 8, a block diagram of a computing device 800 for caching information associated with network devices is shown in accordance with some embodiments. In particular, computing device 800 may store information associated with network devices (e.g., network device 302, network device 304, network device 306, and/or the network device 308) in cache 850.

The computing device 800 may store information 860 in cache 850. Information 860 may be associated with one or more of the network devices. Information 860 may include one or more criteria 862 related to operation of one or more network devices (e.g., a network device). Criteria 862 may include factors for operating one or more devices (e.g., an "operation criterion"). For example, an operation criterion may indicate a value for an attribute, a setting, a mode, or the like related to operation of a network device. Criterion 862 may include a criterion indicating an instruction for controlling operation of one or more network devices (e.g., an "instruction criterion"). For example, an instruction criterion may indicate one or more conditions for applying operation criterion. Criterion 862 may include a rule. A rule may be based on either or both of an instruction criterion and an operation criterion. A criterion may be based on, for example, time, date, weather, geographical location, an event, or combinations thereof.

Information 860 may include device information 864 (e.g., "device list"). Device information 864 may include information corresponding to one or more network devices connected to a network. For example, device information 864 may include a device list. The network may include a network to which computing device 800 is connected. In some embodiments, device information 864 may include an identifier (e.g., a device identifier) corresponding to each network device on the network, a device address (e.g., a device IP address), other information about the network device, or combinations thereof. Device information 864 may include operation information corresponding to information about a network device. Operation information may include a type of a device, an attribute of a device, a setting of the device, a state of a device, connectivity of a device to a network, or combinations thereof.

Information 860 may include status information 866. Status information 866 may include information related to a status of one or more network devices connected to a network. Status information 866 may be based on status data received from one or more network devices. Status information 866 may include other status information about network devices, e.g., current information related to operation of each network device. For example, status information 866 may include a current value of a setting of a network device, a current value of an attribute of a network device, a current state of a network device, a current mode of a network device, a current value of a configuration of a network device, status information described with reference to FIGS. 3-5, or combinations thereof.

Information 860 may include other information 868 related to one or more network devices connected to a network. Such information 868 may include registration information (e.g., a security key) for a network device connected to a network. Information 868 may be received from a network device. Other information 868 may include information communicated between network devices.

In some embodiments, information 868 may include display and control information about states of operation of network devices. The display information may be based on one or more factors related to network connectivity, such as a type of network connection (e.g., connection via a local network or a remote network) to a network device. Computing device 800 can determine an appearance and/or functionality of an interactive active element for a network device based on the display information and determining network connectivity to the network device using techniques disclosed herein.

In certain embodiments, computing device 800 may include or be implemented as an access device, a network device (e.g., the network device 102), a router, a gateway (e.g., the gateway 110), a hub device, a repeater device, a range extender, an access point, a bridge, a base station, a Node B device, eNode B device, an access point base station, a Femtocell device, a modem, any other device that provides network access among one or more computing devices and/or external networks, the like, or a combination thereof. Computing device 800 may include a home automation device such as one that may be included in network device 102 or network device 302. Computing device 800 may include an IoT device.

Computing device 800 may include any human-to-machine interface with network connection capability that allows access to a network. For example, computing device 800 may include a stand-alone interface (e.g., a cellular telephone, a smartphone, a home computer, a laptop computer, a tablet, a PDA, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). Computing device 800 may be configured to execute an application, a web browser, a proprietary program, or any other program executed and operated by a computing device.

In certain embodiments, computing device 800 may be implemented as one or more functional blocks or modules configured to perform various operations for caching information associated with network devices (e.g., network device 302, network device 304, network device 306, and/or the network device 308). The functional blocks and modules may be implemented in hardware, firmware, software, or combinations thereof. Computing device 800 may include a communication module 820, an interface manager 870, a communication manager 810, a request manager 830, and authorization manager 840. Computing device 800 may include one or more interface(s), e.g., interface 880. Interface 880 may include a physical interface, a graphical interface, other types of interfaces, or combinations thereof. For example, interface 880 may provide interface 605 of FIG. 6 and/or interface 705 of FIG. 7.

Communication module 820 may support communication with other devices, such as a network device (e.g., one or more of network devices 302-308), an access device, or both. Communicate module 820 may support communication with one or more networks, such as a network (e.g., a local area wireless network) to which one or more network devices are connected, or a remote network. Communication module 820 may include one or more wireless transceivers operable to receive and transmit wireless signals (e.g., signal 810). Wireless signals may be received and transmitted via an antenna of computing device 800. Communication module 820 may communicate with other devices via a local area network. The local area network may include a wireless network, a wired network, or a combination of a wired and wireless network. Communication module 820 may provide network access to other network devices. The network access may be of any type of network familiar to those skilled in the art that can support data communications using any of a variety of commercially-available protocols. In some embodiments, the wireless network may be any wireless network such as a wireless local area network (e.g., local area network 100), such as WiFi, a PAN, such as Bluetooth® or Zigbee®, or a cellular network (e.g. a GSM, WCDMA, LTE, CDMA2000 network). For example, communication module 820 may provide wireless communication capabilities for a local area network using a communications protocol, such as WiFi™ (e.g., IEEE 802.11 family standards, or other wireless communication technologies, or any combination thereof). Using a communications protocol (s), communication module 820 may support radio frequencies on which wireless enabled devices in the local area network can communicate.

Communication module 820 may be configured to enable devices (e.g., network device 302, network device 304, network device 306, and/or the network device 308) to communicate with each other in a local area network (e.g., the network 300). In some embodiments, communication module 820 may provide a device access to one or more external networks, such as a remote network (e.g., cloud network 114), the Internet, and/or other wide area networks.

In some embodiments, communication module 820 may communicate directly with a network device (e.g., any of the network devices 102-106 or any of network device 302-208). For example, communication module 820 may be configured to communicate directly with a network device. Such direct communication may occur by use of Zigbee™ signals, Bluetooth™ signals, WiFi™ signals, infrared (IR) signals, or the like. In some embodiments, direct communicate with a device, such as a network device, may occur when computing device 800 has authorization to communicate with the network device using a network. Request manager 830 may determine authorization. In some embodiments, while computing device 800 may be configured to communicate with a network device, but computing device 800 may be unable to communicate with the network device when computing device 800 does not have authorization to communicate with the network device via a network (e.g., a local network 300). Communication module 820 may handle communication with a network device and/or a network (e.g., a local network or a remote network). In some embodiments, computing device 800 may communicate with a remote network (e.g., a cloud network 114) to communicate with a network device. Such communication may occur when computing device 800 does not have access to a network including the network device or when computing device 800 does not have authorization to communicate with the network device via a network including the network device.

In some embodiments, communication module 820 may send and receive unicast transmissions. For example, communication module 820 may send a unicast transmission directly to another network device. The unicast transmission may include a request for information, such as any type of information, e.g., criteria 862, device information 864, status information 866, or other information 868, associated with a device. A network device may be identified using device information 864 corresponding to a network device to which the communication is directed. In another example, communication module 820 may receive a unicast transmission from another network device. A unicast transmission may be routed through another network device, such as gateway 110. Communication module 820 may support unicast transmission using user datagram protocol (UDP), TCP, HTTP, HTTPS, or other suitable protocols.

In some embodiments, communication module 820 may send and receive transmissions broadcasted via a network to which computing device 800 is connected. The transmissions may include multicast transmissions and/or broadcast transmissions. Communication module 820 may communicate using UDP, UPnP, or other suitable protocol.

Communication manager 810 may manage communication with devices. Specifically, communication manager 810 may determine communication capabilities of computing device 800 and may use such capabilities to determine whether a network, a device, or both are accessible to computing device 800. Communication manager 810 may be implemented as one or more functional blocks or modules configured to perform various operations for communication manager 810. Communication manager 810 may include a communication capabilities detector 812 and an access determiner 814.

Communication capabilities detector 812 may detect communication capabilities of computing device 800. Such information may be provided by communication module 820. Communication capabilities detector 812 may determine whether computing device 800 has a capability to communicate, either using wireless communication or wired communication, with a network and/or a network device. Communication capabilities detector 812 may determine communication capabilities based on a type of computing device 800 and/or other information stored by computing device 800 that indicate its communication capabilities. In some embodiments, a communication capability may be determined based one or more protocols supported for communication. A communication capability may include a communication protocol that is supported by communication module 820 for communication with a network, a network device, or combinations thereof. In some embodiments, a communication capability may include the ability to communicate with a discovered network or device. Communication capabilities detector 812 may determine capabilities based on a type of network and/or network device that is discovered. It can determine whether communication module 820 is equipped to communicate with the discovered network or network device. If so, then communication capabilities detector 812 can determine the hardware, software, firmware, protocol(s), or combinations thereof, which can be used to communicate with a discovered network and/or network device.

Access determiner 814 may determine whether computing device 800 has access to a network (e.g., a wireless network), which includes a network device. Access to a network may correspond to an ability of computing device 800 to communicate with the network. Communication with the network may be based on whether computing device 800 is registered and authorized to access the network. In some embodiments, computing device 800 may have access to a network, but may not have access to network devices in the network. Access to the network devices may be based on whether computing device 800 has registered and obtained authorization to communicate with the network devices. As such, access to a network may be based on whether computing device 800 has access to communicate with the network devices on the network. Access may exist when the network devices are accessible to computing device 800.

An ability to communicate with the network may be based on whether computing device 800 and the network support communication using a communication protocol. An ability to communicate with the network may be based on computing device's 800 location with respect to a communication distance from the network. A communication distance may be one which permits a computing device to communicate with the network, or a combination thereof. Access determiner 814 may discover a communication protocol supported by the network.

Access to a network may be determined based on whether computing device 800 has established a communication connection to the network. An established communication connection may indicate that computing device 800 has accessed the network and therefore, can communicate with the network. In some embodiments, access to the network may be based on whether computing device 800 detects a network. In some embodiments, an existence of the network may enable access determiner 814 to determine that computing device 800 has access to the network. In some embodiments, access to a network may be facilitated through a remote network (e.g., cloud network 114). Access determiner 814 may determine that access to the network exists based on computing device 800 having an ability to communicate with the remote network.

In some embodiments, access determiner 814 can determine whether computing device 800 has access to one or more networks. Networks may include local networks (e.g., network 300) and/or remote networks (e.g., cloud network 114). For example, if a local network exists, access determiner 814 may determine an identifier (e.g., a network identifier or SSID) of the local network. Assuming that computing device 800 can communicate with the local network using a communication protocol supported by computing device 800, computing device 800 may search its storage to determine the identifier(s) associated with the networks it has knowledge of. In some instances where computing device 800 is registered and authorized to access a network with network devices, computing device 800 may store a network identifier in association with a security key. Using the identified stored by computing device 800, access determiner 814 may compare its stored identifiers with the identifier of the local network for which access is being evaluated. Access determiner 814 may determine that computing device 800 has access to the network based on determining that a stored identifier matches an identifier of the network being evaluated. In some embodiments, access determiner 814 may search its storage for a security key that is stored in association with an identifier of a network for which connectivity is being evaluated. The existence of a security key in association with an identifier of a network may indicate that the computing device 800 is permitted to access the network.

In some embodiments, computing device 800 can implement an enhanced network fingerprinting mechanism that relies on the normal transient resonance of connected devices within a network to uniquely identify a network. A network fingerprint or signature is generated that enables identification of a unique network from any other network. A network can have multiple network devices that are connected to the network at any given time. Some of these network devices are 'persistent' devices that are connected to the network almost all of the time (e.g., Set Top Boxes/STBs, Media Servers, network-attached storage (NAS) devices, connected light bulbs, etc.). Some other network devices are typically connected most of the time (e.g., desktop computers, connected/smart TVs, etc.). Yet other network devices some are connected to the network some of the time (e.g., Smart Phones used by or belonging to residents of a site associated with the network, tablet devices, laptops, etc.), and some other network devices are seldom connected (e.g., guest devices). A network device can be an internet of things (IoT) device. Based on learning and recording these 'transient resonances' of these specific network devices with specific media access control (MAC) addresses, techniques described herein can fingerprint a specific network with high accuracy. A local area network may be assigned a unique network identifier based on devices connected to it. A network profile can be associated with a unique network identifier. Accordingly, multiple, different network identifiers may be associated with a network due to new devices being connected to the network.

In one example, computing device 800 can be an access device, which can access the network devices after a current network identifier has been compared to a previously created network identifier in order to associate the access device with the same local area network that the network devices are connected to. Thus, computing device 800 can determine whether it is connected to a network (e.g., a local area network) that includes network devices connected to the network.

The access device can access a cache 860, which can include a network identifier table with records including fingerprints reflecting known access devices network devices at different points in time. Each of records can include a fingerprint, a timestamp indicating when the fingerprint was taken, and other information such as the number of devices in the network at the time. The network identifier table can include a record for each fingerprint stored by the access device, where fingerprints reflect devices known to exist on the local area network. In an embodiment, the fingerprints stored in cache can be hash values generated by executing a cryptographic hash function. Within the context of network fingerprinting, embodiments can compare network fingerprints created at different points in time with fingerprint snapshots to determine that network devices and access devices should be associated with the same network. These comparisons of fingerprints can be performed by computing device 800 or a remote server, such as a server associated with the cloud network 114, in order to associate a newly discovered network device and/or a newly discovered access device with an existing network. Fingerprint comparisons can also be done locally on an access device or a gateway in cases where a connection to the Internet or the cloud network 114 is unavailable or unreliable, and immediate use of a newly discovered network device is desired. An application on computing device 800 or a relatively stationary device such as gateway 110 could, based on fingerprint snapshots received from the network device and computing device 800, determine that the network device and the computing device 800 are connected to the same network. Records stored in cache 860 store network fingerprints and timestamps that reflect known network devices. The computing device 800 uses the records in cache 860 to determine that it is associated with the same network as a given network device. For example, the cache 860 can include a fingerprint reflecting the network device, computing device 800, and other network devices in the local area network.

Techniques are described for network fingerprinting using media access control (MAC) behaviors. The techniques create network identifiers reflecting network devices connected to wireless and wired networks. The network identifier can be a network fingerprint reflecting properties of a gateway. The gateway properties may include a service set identification (SSID) of the home local area network, a media access control (MAC) address of the gateway, and/or the like. The network device may transmit its unique identifier to a server, such as a cloud network server. In some embodiments, the unique identifier sent by the network device may be used to determine information relating to the network device (e.g., MAC address, serial number, or the like), and an access device may send its own unique identifier that can be used to determine information relating to the access device (e.g., MAC address, serial number, application unique identifier, or the like).

The network identifier can reflect network devices that have not previously been seen by an application on the access device. In some examples, a server (e.g., a server of cloud network 114) may determine properties for a plurality of network devices connected to a home local area network. The plurality of network devices may include devices that have previously been seen by the application on the access device, as well as network devices that have not previously been seen. In one example, a network identifier (e.g., a network fingerprint) is created that reflects properties of each of the connected network devices that are accessible using application executing on an access device. In other examples, the network identifier is defined based on all network devices, access devices, gateways, range extenders, and other devices connected to the network. Such connected devices can include wearable devices, embedded devices, ambient sensors, and other devices having communications capabilities usable to communicate via the network. A network device whose properties are reflected in a network fingerprint may be a newly discovered network device. The network device can be a relatively stationary device such as, for example, a network gateway, a personal computer, a connected television (i.e., a smart TV), or a touchscreen device mounted on a wall or other surface (i.e., a touchscreen integrated into the door of a refrigerator or another appliance). For example, a home local area network may include a gateway connected to a discovered network device. The server may determine that a network device is associated with a known network, and thus that the device key for the network device needs to be provided to the gateway and/or an access device that is also associated with the network. For example, the server may determine the existence of multiple device keys corresponding to respective network devices based on communications from the network devices and/or communication from a mobile device that is associated with the network. Upon discovering a network device that is connected to a home local area network, the server may receive a unique ID for the network device, use the unique ID to determine properties for the network device, and generate a network identifier that reflects the network device's properties as well as respective properties of the mobile device and the gateway.

In certain embodiments, a network device may have a unique identifier assigned to it. For example, hardware address for the network device may be uploaded to the server, added to a device registry associated with a network, and evaluated to determine device properties. According to these embodiments, a network identifier is generated that includes indications of the time the identifier was created, an indication of the network device, and indications of access devices and other network devices associated with the network. For example, the network identifier may be embodied as a network fingerprint that reflects a timestamp when the fingerprint was created, the network device, its properties, and identities and properties of other network devices that were previously discovered, registered, and uploaded to a device registration and discovery service hosted on the server. The server may then transmit the network fingerprint to computing device 800 (e.g., an access device) associated with the home local area network. Once received by the computing device 800, the network fingerprint is usable to determine that network devices are associated with the same network. For example, the network fingerprint may also be usable to determine that different users are associated with the same network. Accordingly, a network identifier can include an indication of a newly discovered network device and can be transmitted to a server so that the network identifier can be used to authenticate the network device to the network and associate the network device with the network, regardless of whether the network device has previously been connected to or associated with the network or another network device connected to the network.

In some examples, network devices may send respective communications to a server indicating that they are connected to a local area network. For example, a first network device may send a first unique identifier and a second network device may send a second unique identifier to the server. The server can use the unique identifiers to determine respective properties of each of the network devices and use the properties to generate a snapshot of a fingerprint for the network that indicates the time at which the snapshot was taken. A mobile device may subsequently discover the first and second network devices, and compare one or more previous snapshots of the network fingerprint with a current network fingerprint snapshot to determine that the network devices are associated with the same network, and then authenticate the network devices to the network based on the snapshot comparison. By determining that the network devices are associated with the same network, computing device 800 can determine that it is connected to a local network that has the network devices.

In an example, the first and second unique identifiers are the respective hardware addresses of the first and second network device. The hardware addresses can be used to determine or infer respective properties of first and second network devices. For example, in embodiments where the hardware addresses are MAC addresses, portions or substrings of the MAC addresses can be used to determine a manufacturer, device type, a transience level, and logical name for each network device connected to a network. These and other properties can then be used to create a network identifier (e.g., a network fingerprint) for the network. In one embodiment, the network identifier can include a hash value that is generated by executing a cryptographic hash function.

In some embodiments, transient devices, such as, for example, certain mobile network devices and access devices, are assigned lower weights than more permanent devices, such as, for example, gateways, routers, televisions, appliances (e.g., refrigerators, washing machines, dryers, dishwashers, air conditioners and other large appliances), embedded devices, and game consoles. By assigning such lower weights to more transient devices, discovery and rediscovery of such transient devices will have less impact on the overall network fingerprint than discovery and rediscovery of more permanent devices. For instance, periodic or temporary disconnections and reconnections of transient devices such as smartphones, tablets, laptops, and portable gaming devices may be reflected in a network fingerprint, but due to the relatively low weight assigned to these devices, the fingerprint will not be impacted as greatly as when a more permanent device such as a smart television is connected to or disconnected from the network. For example, a tablet device may exhibit usage patterns of being disconnected from a local area network for several hours each weekday (e.g., while being used on another, remote network such as a work or school network). Similarly, an access device may exhibit patterns of being disconnected from a local area network each weekday morning and being re-connected to the local area network each evening. Patterns over time can be identified and factored into weights for such transient devices. In this way, network fingerprints for a given network may be considered to be substantially identical when their only differences are the connectivity status of transient devices. That is, fingerprints over time can be compared and evaluated as having only negligible differences or insignificant changes when transient devices are disconnected from and re-connected to a network. The network fingerprints can be compared over time to determine whether changes in a network are significant or not. If enough, significant differences in fingerprints are identified, such as, for example, the presence of different permanent devices and different gateways and routers, the comparisons can determine that the networks being compared are different networks. As such, computing device 800 can determine that it does not have access to a network because the network is different based on the differences in the fingerprints of the network devices.

In some examples, respective properties of network devices connected to a local area network are reflected in a network identifier for that network. For example, a unique identifier of a network device connected to a local area network can be analyzed to determine the device's manufacturer, logical name, transience level, and other properties. The network identifier can be compared to other network identifiers created over time to associate a user and/or a network device with a local area network. By using such network identifiers (e.g., network fingerprints), a user that has not previously been associated with a network, but who is using computing device 800 (e.g., an access device) previously connected to the network, can be authenticated to the network. Similarly, network fingerprints created at different points in time can be compared to associate devices with a local area network. For example, when an access device that is being used by a user who has been previously authenticated to the network is connected to a network for the first time, that device can be associated with the network based on the user's other devices being reflected in prior fingerprints of the network.

In some embodiments, a process can be implemented by computing device 800. Computing device 800 can receive a communication including a unique identifier of a network device connected to a network. This step can be performed as part of discovery of a network device. In an embodiment, the communication received can include a unique hardware address such as, for example, a MAC address, of a network device connected to a network. Computing device 800 can also receive a snapshot of a network fingerprint. Next, computing device 800 can use the unique device identifier to determine information about the network device (e.g., device type, manufacturer, logical name, transience level/weighting factor). In embodiments, the determination performed in can be performed on a server of cloud network 114. Next, computing device 800 can receive a network identifier of the network (e.g., a network fingerprint) is received. The network identifier received can reflect the discovered device and other devices connected to the network. Next, computing device 800 can compare the network identifier to a previously generated network identifier(s) to confirm network identity, to determine significance of any network change(s), and/or to identify relative transiency of devices. The computing device 800 can identify persistent devices, transient devices, and/or guest devices based on comparing a received network identifier with previously generated network identifiers generated at different points in time in the past. The computing device 800 can register and authenticate a device based on the comparison of the network identifiers. Next, the computing device 800 can store the received network identifier as the current version of network identifier (e.g., the current fingerprint). The network identifier can be stored with a timestamp as a record in the cache 860. By identifying matching network identifiers, computing device 800 can further determine that is connected to the network based on identifying a matching network identifier.

Techniques are described for creating network identifiers such as network signatures or fingerprints. The techniques can employ active or passive collection of configuration attributes and properties from connected network devices, gateways, and access devices. The attributes can be actively reported by the connected devices and gateways during network communications. For example, a server can poll the network for the attributes and properties. The attributes and properties can also be passively collected as part of a discovery process for the network devices and the access devices. The discovery process can include using a unique identifier provided or communicated by connected devices to determine attributes of the devices. The attributes may then be incorporated into a network fingerprint. The attribute values may be combined with a timestamp to form a network signature, or fingerprint, for the network.

Upon determining that computing device 800 has access to the network, access determiner 814 may proceed to determine whether it can connect to the network if it has not already connected to the network. The connectivity to the network may be used by computing device 800 to determine the connection for sending a request to control operation of a network device. Access determiner 814 may further determine the network devices for which access is permitted via the network.

Upon determining that computing device 800 is not connected to a local network, access determiner 814 may determine whether it has access to a remote network (e.g., network 114) by which access is permitted to network devices on a local network. Access determiner 814 may determine that it has access to a remote network based on determining that it does not store an identifier of a local network. In some embodiments, the existence of a security key may indicate access to a local network via a remote network. The security key may be used to access a remote network, which is identified based on information in storage associated with the security key. The security key may be generated as part of a registration process between computing device 800 and one or more network devices on a local network accessible via the remote network. The security key may be used to communicate with the remote network. For example, communications sent to a network device via the remote network may be encrypted using the security since the communications are not on a trusted network, being facilitated through the remote network. Communications sent by the network devices to computing device 800 via the remote network may be encrypted using the same security key. Computing device 800 may use the security key to decrypt communications.

Detector 812 may enable computing device 800 to communicate with network devices selectively via networks that are accessible to computing device 800. By determining whether a local network is accessible to computing device 800, computing device 800 may intelligently choose the local network, whereby communication is trusted rather than communication via a remote network that involves the use of additional security mechanisms.

Interface manager 870 may manage one or more interfaces, e.g., interface 880. Interface manager 870 may be implemented as one or more functional blocks or modules configured to perform various operations for managing interface 880. The functional blocks and modules may be implemented in hardware, firmware, software, or combinations thereof. Interface manager 870 may include an interface generator 872 and an input handler 874.

Interface generator 872 may generate an interface, e.g., interface 880. Interface 880 may be generated or adjusted in response to input received using interface 880. Interface generator 872 may generate or update interface 880 based on a received input or a request for more information, e.g., device information or rule information.

Input handler 874 may manage processing input received from interface 880. Input handler 872 may process input received from interaction with one or more interactive elements in interface 880. Interaction may include one or more actions including touching, tapping, swiping, sliding, waving, pressing, dragging, shaking, selecting, an action based on interaction with an interface, or combinations thereof. Input handler 874 may process input received from interface 880. The input may correspond to a request for information. The information may include any of information 860 stored locally on computing device 800. For example, input handler 874 may process input corresponding to interaction with rules icon 620 such that input handler 874 may request for rules (e.g., criteria 862) associated with one or more network devices on a network accessible to computing device 800. In some embodiments, input handler 874 may cause request manager 830 to request information based on the input.

Request manager 830 may handle requests received by computing device 800. A request may be based on input received via interface 880. For example, a request may correspond to interaction with devices icon 618. In this example, based on the input, request manager 830 may obtain device information to present via interface 880. Request manager 830 may be implemented as one or more functional blocks or modules configured to perform various operations for managing interface 880. The functional blocks and modules may be implemented in hardware, firmware, software, or combinations thereof. Request manager 870 may include a request identifier 832 and a requestor 834.

Request identifier 832 may identify a type of a request. A request may be received from another element in computing device 800 or may be generated based on input via interface 880. Request identifier 832 may determine a type of a request based on input received via interface 880. The input may correspond to interaction with an icon (e.g., device icon 618 or rules icon 620) displayed in interface 880. A type of request may correspond to a type of information requested using interface 880. In some embodiments, a request may be received for information such as a criterion related to operation of a device, device information, status information, other information related to operation of device, or combinations thereof. In some embodiments, information 860 may not exist or may not be current. As such, request identifier 832 may determine a type of request to send to a network and/or to a network device to obtain current information related to operation of devices on the network. The current information may requested based on a type of request. In some embodiments, a request for current information may be based on a criterion related to operation of a device, device information, status information, other information related to operation of device, or combinations thereof.

In some embodiments, a type of request may correspond to operation of a network device on the network. A type of request may correspond to input received via interface 880. The input may be used to determine a type of action for controlling operation of a network device. For example, a type of action may include turning a network device on/off or adjusting a setting or an attribute related to operation of a network device. In this example, a type of request may be a request to control operation of a network device based on the type of action indicated by the input.

In some embodiments, a type of request may be identified based on the type of action indicated by the input. For example, a type of action may correspond to displaying information about network devices on a network. In this example, a type of request may be for device information about network devices on the network. The device information may provide information to display about network devices on the network. In yet another example, the received input may indicate a request to display current criteria related to controlling operation of network devices on the network. In this example, a type of request may be for a current criterion related to controlling operation of network devices on the network. In yet another example, the received input may indicate a request for current status information related to operation of network devices on the network. In this example, a type of request may be for current status information related to operation of network devices on the network.

Requestor 834 may send a request to a network and/or a network device. The request may be sent based on the identified type of request. In some embodiments, the request may include information indicating a type of information sought for the identified type of request. For example, a request may include information indicating a request for device information, a request for status information, other information relation to operation of a network device, or combinations thereof. For example, a request may include a discovery request for current device information identifying devices connected to the network.

In some embodiments, requestor 834 may implement techniques for sending a request to a network device. A request may be sent based on whether computing device 800 has access to a network including the network device. A request may be sent based on whether computing device 800 is authorized to communicate with the network device.

Authorization manager 840 may determine whether computing device 800 is authorized to communicate with a network device. By having authorization to communicate with a network device, computing device 800 may communicate with the network device directly. However, such communication may be dependent on whether both the network device and computing device 800 support a communication protocol to facilitate their communication. Direct communication between the network device and computing device 800 may depend on whether computing device 800 is located within proximity to support use of the communication protocol.

In some embodiments, authorization manager 840 can determine whether computing device 800 is authorized to communicate with a network device by determining whether computing device 800 has registered with a remote network, e.g., cloud network 114. By being registered with a remote network, remote network can establish a security key for computing device 800. The security key may be associated with a security key established for a network device. Computing device 800 may store the security key locally. The existence of the security key on computing device 800 may provide an indication that computing device 800 has authorization to communicate with network device. A network device can determine whether it is registered with the remote network such that it can communicate with computing device 800. When a network device receives a communication from computing device 800, the network device may determine whether it is registered to communicate with computing device 800. In some embodiments, a network device may be registered to communicate with computing device 800 if it stores a security key for itself and computing device 800, and both security keys are associated with each other. A network device may process the communication received from computing device 800 if the network device is registered to communicate with computing device 800.

Requestor 840 can determine a manner by which to communicate with a network device based in part on authorization of computing device 800 to communicate with the network device. In some embodiments, when computing device 880 does not have access to the network (which includes the network device), e.g., network 300, and computing device 800 is authorized to communicate with the network device on the network, requestor 834 may send a request to a network device by using a remote network (e.g., cloud network 114). To illustrate further, a request may be sent using a remote network when computing device 800 does not have access to the network because computing device 800 is not located within a distance that enables computing device 800 to communicate with the wireless network. In such an embodiment, computing device 800 may communicate with the network via a remote network. A remote network may perform one or more operations to process a request from computing device 800 and may send the request to the wireless network. The request may be sent via a gateway, e.g., gateway 110. In another example, a request may be sent using a remote network when computing device 800 does not have a security key enabling it access to communicate with the network device. In such an embodiment, even when the computing device can communicate with the network, the request may be directed to a remote network.

When computing device 800 has access to a network (including a network device) and is authorized to communicate with the network device on the wireless network, requestor 834 may send a request using the network. For example, a request may be sent to the network to which computing device 800 has registered with. The network device may receive the request via the network. In some embodiments, using the network to send the request may include sending a direct transmission. In some embodiments, the request may be sent via a direct transmission rather than sending the request using the network.

Some embodiments, such as those described with reference to FIGS. 9 and 10, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 9 and 10, may be implemented in software (e.g., code, instructions, computer instructions, program) executed by one or more processing units (e.g., processors cores), hardware, or combinations thereof. The software may be stored in a memory (e.g., on a memory device, on a non-transitory computer-readable storage medium). In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. In some embodiments, the processes depicted in flowcharts herein can be implemented in the system described with respect to FIGS. 1-5. The particular series of processing steps in this disclosure are not intended to be limiting. Other sequences of steps may also be performed according to alternative embodiments. For example, alternative embodiments of the present invention may perform the steps outlined above in a different order. Moreover, the individual steps illustrated in the figures may include multiple sub-steps that may be performed in various sequences as appropriate to the individual step. While processing depicted in FIGS. 9 and 10 may be described with respect to accessing a single request or a single response, such processing may be performed for multiple requests and responses, in any number of combinations. Furthermore, additional steps may be added or removed. One of ordinary skill in the art would recognize many variations, modifications, and alternatives.

In an aspect of some embodiments, each process in FIGS. 9 and 10 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Now turning to FIGS. 9 and 10 are examples of techniques that a computing device, e.g., computing device 800 may perform to determining connectivity to a network device for communication with the network device. Such techniques may reduce time for communicating with a network device, such that information may be communicated faster to/from network devices. Determining the connectivity to a network device may enable the computing device to selectively determine information (e.g., status information) to display to a user based on the connectivity. Such techniques may reduce the time for presenting status information to a user, thereby improving user experience and reduce time during startup of an application that presents the information. The processes described with reference to FIGS. 9 and 10 may be implemented by an access device (e.g., access device 108), or a network device (e.g., network device 302, network device 304, or network device 306).

FIGS. 9 and 10 show flowcharts illustrating processes 900, 1000 for determining connectivity to network devices in accordance with some embodiments. Specifically, the processes 900, 1000 depicted with respect to FIGS. 9 and 10 may be implemented to determine connectivity to a network device to improve performance for controlling operation of the network device. For example, an access device (e.g., access device 108) may determine connectivity using a network, if available, to a network device. The processes 900, 1000 may determine whether the access device has access to a network including the network device. If such a network is accessible, one or more communication paths may be chosen to communicate with the network device.

In some embodiments, processes 900, 1000 may choose a communicate path which may improve communication with the network device. A faster or more efficient path may enable information to be exchanged faster between an access device and a network device. An improvement in communication for exchanging information may provide many technical advantages. A faster communication path may improve performance for controlling operation of a network device because a setting or an attribute for controlling operation of a network device may be communicated to and from a network device faster. Information about a network device or other information (e.g., a rule or device information) may be received faster by the access device. Such an improvement may enable the access device to present information about a network device (e.g., a status of operation or a rule for controlling the network device) sooner, thereby improving an overall user experience for controlling the network device.

In FIG. 9, process 900 may begin at step 902 by detecting input corresponding to interaction with an interface of a computing device (e.g., an access device). For example, computing device 800 may detect input corresponding to interaction with an interface, such as interface 605 of FIG. 6, to control operation of a network device. The input may correspond to a request via the interface to control power on the network device.

At step 904, a determination is made whether the computing device is connected to a network. The network may include or have access to one or more local networks and/or one or more remote networks (e.g., a cloud network). The local network(s) may include one or more network devices, one of which may be the network device for which input was detected at step 902. The determination as to whether a computing device is connected to a network may be based on whether the computing device has access to a network that may enable communication with the network device for which input was detected at step 902. Step 906 and/or step 910 may be performed to determine whether the computing device is connected to a network, such that the network includes either or both of a local network including a network device or a remote network that provides access to the local network. Regardless of the networks to which connections are available, a computing device can selectively determine whether it has connections to multiple different networks. The computing device may determine whether it has a connection to local and/or remote networks, which it can use to determine the better connection for communication with a network device.

At step 906, a determination is made whether the computing device is connected to a local network (e.g., a wireless network) including the network device for which input was detected at step 902. In at least one embodiment, determining that the computing device is connected to a local network includes detecting a local network and determining an identifier associated with the local network. The identifier associated with the local network may be compared to a stored identifier, stored on the computing device, associated with the local network. A determination can be made that the computing device is connected to the local network upon determining that the identifier associated with the local network matches the stored identifier associated with the local network. In some embodiments, the identifier may be stored in association with a security key that provides access to the local network. Therefore, the existence of the identifier stored on the computing device may be indicative that the computing device is connected to the local network because the computing device has the security key to access the local network.

In some embodiments, determining that the computing device is connected to the local network may include determining that the computing device has authorization to communicate with the network device on the local network. The computing device may have authorization to communicate with the network device on the local network when a security key stored is stored on the computing device and the security key is associated with an identifier (e.g., a network identifier) of the local network. Determining that the computing device is connected to the local network includes determining that the computing device has access to the local network. The computing device may have access to the local network upon determining that the computing device has established a communication connection to the local network. Determining that the computing device has access to the local network may include determining whether a communication protocol of the computing device supports communication with the network device using the local network. When the computing device supports communication with the network device using the local network, it can be determined that the computing device has access to the local network.

At step 908, based on determining that the computing device is connected to the local network, a message can be sent to the network device using the local network. The message may correspond to an operation of the network device. The message may be sent based on the input detected at step 902. For example, the message may be a request to control operation of the network device based on the input detected at step 902. Process 900 may end at step 914 after sending the message.

Continuing process 900, at step 910, a determination may be made as to whether the computing device is connected to a remote network. Such a determination may be made to access a network device on a local network via the remote network. Therefore, connectivity to the remote network may be analyzed as to whether a network device can be accessed using the remote network. Step 910 may be performed based on determining that the computing device is not connected to a local network including a network device. In some embodiments, step 910 may be performed regardless as to whether a computing device is connected to a local network. A computing device may assess all possible connections to networks, which are used to determine the better connection to utilize for communicating with a network device on a local network. Therefore, step 910 may be performed to determine whether the computing device is connected to a network.

To determine whether the computing device is connected to a remote network, process 900 may include determining that the computing device is not connected to a local network. In at least one embodiments, an identifier associated with the local network is determined. The identifier associated with the local network may be compared to a stored identifier, stored on the computing device, associated with the local network. A determination can be made that the computing device is not connected to the local network upon determining that the identifier associated with the local network does not match the stored identifier associated with the local network. Therefore, the non-existence of the identifier stored on the computing device may be indicative that the computing device is not connected to the local network because the computing device has the security key to access the local network.

In some embodiments, different techniques may be applied to identify the existence of a remote network, and to determine whether a computing device is connected to the remote network. For example, a computing device may determine whether it has a security key that provides access to a network device on a local network, to which the computing device is not connected. The existence of a security key may provide an indication of access to a local network identified by an identifier stored in association with the security key. A computing device may use information about remote networks to determine whether any of those remote networks providing access to the local network including a network device. The computing device may have access to the remote network provided that a security key exists for the network identified by the identifier stored with the security key. Based on detecting an existing remote network identified by the determined information, the computing device can determine that it has access to the remote network. The information may indicate remote networks that can be used to communicate with a local network. The computing device may establish a connection with the remote network by opening a communication channel for communication with a network device on the local network. The computing device may establish a connection with the network device using the security key. By establishing a connection, the computing device can determine that is has a connection to the remote network. A connection to the remote network may be determined using techniques disclosed herein such as those described with reference to FIGS. 1-5.

Based on determining that a computing device is connected to a remote network that provides access to a local network including a network device, at step 912, a message can be sent to the network device using the remote network. The message may correspond to an operation of the network device. The message may be sent based on the input detected at step 902. For example, the message may be a request to control operation of the network device based on the input detected at step 902. Sending the message to the network device using the remote network may include sending the message to the remote network, and where the remote network sends the message received from the computing device to the network device on the local network. A message that is sent to the network device using the remote network may be generated using a security key, such as the security stored on the computing device. The network device may store the same security key such that it can decrypt the message (received from the remote network) using the security key.

Based on determining that a computing device is not connected to a remote network that provides access to a local network including a network device, process 900 may proceed to end at 914.

Now turning to FIG. 10, process 1000 may begin at step 1002 by receiving input corresponding to interaction with an interface of the computing device. For example, input may be received for interaction with a physical interface of a computing device (e.g., an access device). The input may correspond to interaction with an interactive element (e.g., a power button) on the physical interface. In another example, input may be received for interaction with a graphical interface of a computing device. The input may interaction with an interactive element (e.g., a power button) on the graphical interface. For example, the input may correspond to tapping an image of an application, which causes the application to be launched.

At step 1004, a determination is made whether the computing device has access to a local network (e.g., a wireless network) including a network device. In some embodiments, access to the local network may be determined based on whether the computing device has established a communication connection to the local network. The computing device may establish a communication connection by registering with the local network. Thus, the computing device may have established a communication connection with the local network by successfully registering with the local network.

In some embodiments, access to the local network may be determined by discovering a communication protocol of the computing device (e.g., a wireless communication protocol) and determining whether the communication protocol is supported for communication with the local network. The computing device may not be able to establish a communication connection to the local network when it is unable to communicate with the local network using a communication protocol supported by the local network. Therefore, in some embodiments, the computing device may have access to the local network when the computing device supports communication using a communication protocol supported by the local network.

At step 1006, a type of request to send may be identified. The type of request may correspond to operation of the network device on the local network. A type of request may be identified based on received input corresponding to interaction with an interface of the computing device. The input may indicate a type of action for controlling operation of a network device. For example, a type of action may include turning a network device on/off or adjusting a setting or an attribute related to operation of a network device. In this example, a type of request may be a request to control operation of a network device based on the type of action indicated by the input. In some embodiments, a type of request may be based on the type of action indicated by the input. In another example, the type of action may include displaying information about network devices on a network. In this example, the type of request may be for device information about network devices on the network. The device information may provide information to display about network devices on the network. In yet another example, the received input may indicate a request to display current criteria related to controlling operation of network devices on the network. In this example, the type of request may be for current criterion related to controlling operation of network devices on the network. In yet another example, the received input may indicate a request for current status information related to operation of network devices on the network. In this example, the type of request may be for current status information related to operation of network devices on the network.

At step 1008, a determination is made whether the computing device has authorization to communicate with the network device on the local network. Authorization to communicate with the network device may be determined by discovering a security key, e.g., a security key including a UUID or a GUID, stored on the computing device. The security key may be associated a network identifier of the local network that includes the network device. As explained above, a server of a cloud network (e.g., cloud network 114) may register a computing device (e.g., access device 108) and a network device with a local network. Registration may include generating a set of unique security keys for authenticating a network device and a computing device, such as an access device. The security key for a computing device may be stored in association with a network identifier of the local network. The existence of the key may indicate that the computing device has been authenticated. Thus, discovery of such a key may be indicative of a computing device's authorization to communicate with a network device on the local network.

At step 1010, a request may be sent to the network device on the local network upon determining that the computing device has authorization to communicate with the network device on the local network. The request may be sent based on the identified type of request. A request may be sent to the network device included on the local network. A manner by which the request is sent may be based on whether a computing device has access to a local network and whether the computing device has authorization to communicate with the network device on the local network.

Upon determining that the computing device does not have access to the local network and upon determining that the computing device has authorization to communicate with the network device on the local network, the request may be sent using a remote network (e.g., cloud network 114). To illustrate further, a request may be sent using a remote network when the computing device does not have access to the local network, such that the computing device is not located with a distance that enables the computing device to communicate with the local network. In such an embodiment, the computing device may reach the local network via the remote network. The remote network may perform one or more operations to process the request and may send the request to the local network. The request may be sent via a gateway. In another example, a request may be sent using a remote network when the computing device does not have a security key enabling it access to communicate with network device. In such an embodiment, event when the computing device can communicate with the local network, such a request may be directed to a remote network.

Upon determining that the computing device has access to the local network and has authorization to communicate with the network device on the local network, the request may be sent using the local network. For example, the request may be set to the local network to which the computing device is registered for access. The network device may receive the request via the local network. In some embodiments, using the local network to send the request may include sending a direct transmission. In some embodiments, the request may be sent via a direct transmission rather than sending the request using the local network.

At step 1012, process 1000 ends.

Figure 11:
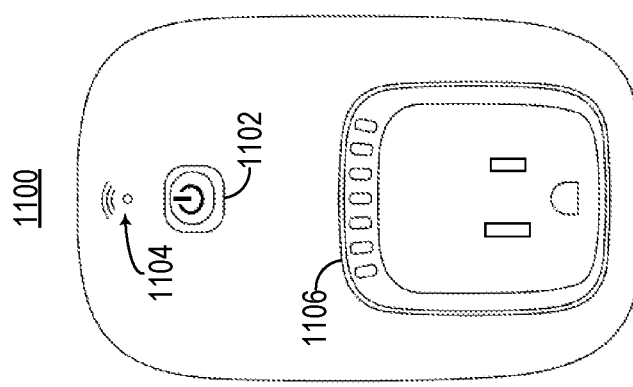
FIG. 11 is an illustration of an example of a front view of a network device, in accordance with an embodiment.
Figure 12:
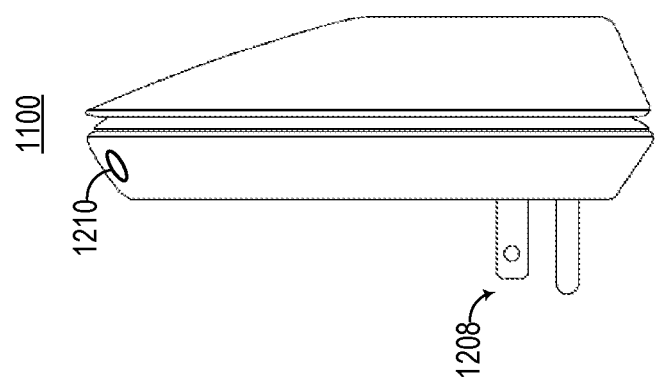
FIG. 12 is an illustration of an example of a side view of a network device, in accordance with an embodiment.

FIG. 11 illustrates an example of a front view of a network device 1100. FIG. 12 illustrates an example of a side view of the network device 1100. The network device 1100 may include any of the network devices 102, 104, or 106 described herein. In some embodiments, the network device 1100 may be a home automation network device. For example, the network device 1100 may include a home automation switch that may be coupled with a home appliance. A user may wirelessly access the network device 1100 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1100 may include a WiFi enabled switch that connects home appliances and other electronic devices to a compatible 802.11b/g/n/ac WiFi network. The network device 1100 may thus allow users to locally or remotely turn devices on or off from anywhere, program customized notifications, and/or change device status. The network device 1100 may further allow a user to create custom schedules or have devices respond to sunrise or sunset.

The network device 1100 includes an power switch 1102 that may be depressed in order to turn the network device 1100 on and off. In some embodiments, a light source may be integrated with or located behind the power switch. For example, a light-emitting diode (LED) may be located on a circuit board under the power button 1102. The light source may be illuminated when the network device 1100 is powered on, and may not be illuminated when the network device 1100 is powered off.

The network device 1100 further includes a communications signal indicator 1104.

The signal indicator 1104 may indicate whether the network device 1100 has access to a communications signal, such as a WiFi signal. For example, the signal indicator 1104 may include a light source (e.g., a LED) that illuminates when the network device 1100 is connected to a communications signal. The light source may depict different colors or other characteristics (e.g., flashing, dimming, or the like) to indicate different levels of signal strength or mode of operation.

The network device 1100 includes a restore button 1210. The restore button 1210 may allow a user to reset the network device 1100 to factory default settings. For example, upon being depressed, the restore button 1210 may cause all software on the device to be reset to the settings that the network device 1100 included when purchased from the manufacturer.

The network device 1100 further includes a plug 1208 and an outlet 1106. The plug 1208 allows the network device 1100 to be plugged into a wall socket, such as a socket providing 120V, 220V, or the like. In turn, an appliance may be plugged into the outlet 1106. Once the network device 1100 is registered according to the techniques described above, an appliance plugged into the socket 1106 may be controlled by a user using an access device (e.g., access device 108).

Figure 13:
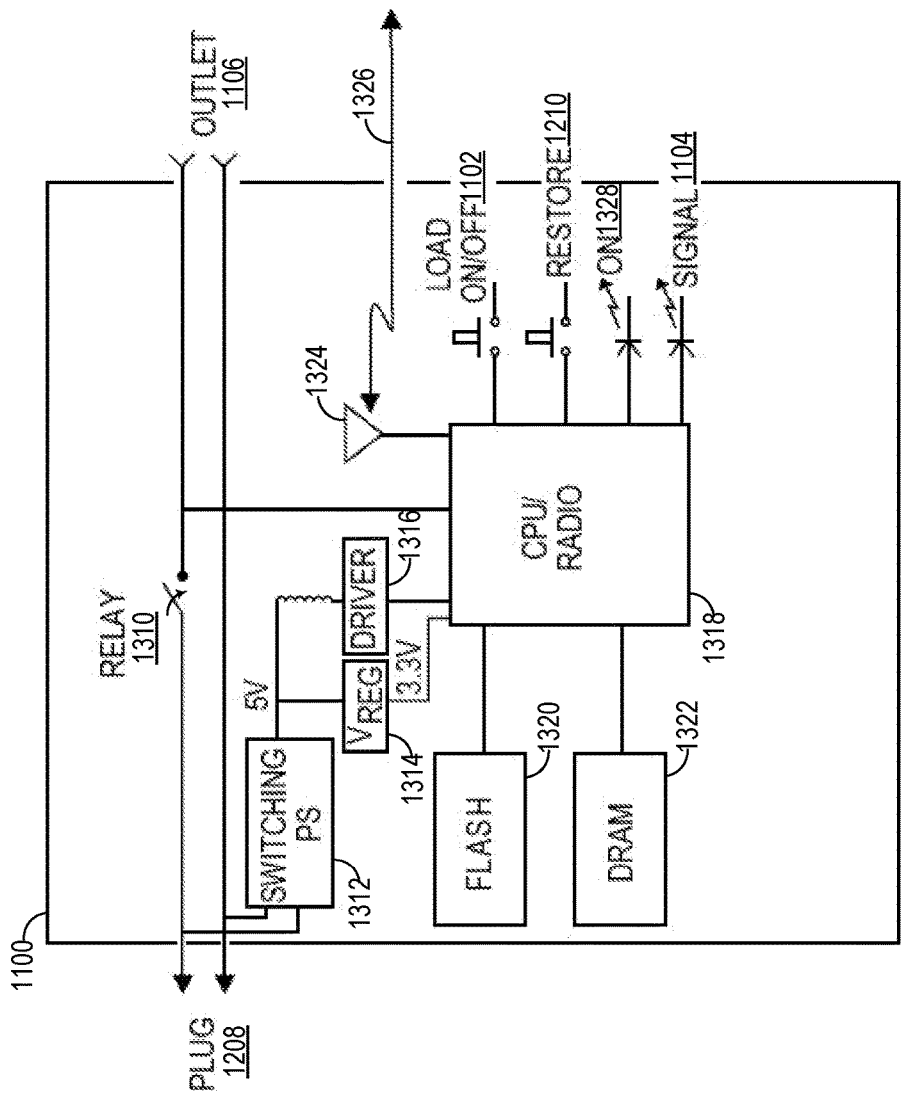
FIG. 13 is an example of a block diagram of a network device, in accordance with an embodiment.

FIG. 13 is an example of a block diagram of the network device 1100 depicting different hardware and/or software components of the network device 1100. As described above with respect to FIGS. 11 and 12, the network device 1100 includes the outlet 1106, the plug 1208, the power button 1102, the restore button 1210, and the communications signal indicator 1104. The network device 1100 also includes light source 1328 associated with the power button 1102. As previously described, the light source 1328 may be illuminated when the network device 1100 is powered on.

The network device 1100 further includes a relay 1310. The relay 1310 is a switch that controls whether power is relayed from the plug 1208 to the outlet 1106. The relay 1310 may be controlled either manually using the power button 1102 or remotely using wireless communication signals. For example, when the power button 1102 is in an ON position, the relay 1310 may be closed so that power is relayed from the plug 1208 to the outlet 1106. When the power button 1102 is in an OFF position, the relay 1310 may be opened so that current is unable to flow from the plug 1208 to the outlet 1106. As another example, an application or program running on an access device may transmit a signal that causes the relay 1310 to be opened or closed. For instance, an access application may display a graphical interface on the access device that includes a power button. The user may tap or otherwise select the power button, and the access application may send a communication signal (e.g., over a WiFi network) to the network device 1100 instructing the network device 1100 to open or close the relay 1310.

The network device 1100 further includes flash memory 1320 and dynamic random access memory (DRAM) 1322. The flash memory 1320 may be used to store instructions or code relating to an operating system, one or more applications, and any firmware. The flash memory 1320 may include nonvolatile memory so that any firmware or other program can be can updated. In the event the network device 1100 loses power, information stored in the flash memory 1320 may be retained. The DRAM 1322 may store various other types of information needed to run the network device 1100, such as all runtime instructions or code.

The network device 1100 further includes a CPU/Radio 1318. The CPU/Radio 1318 controls the operations of the network device 1100. For example, the CPU/Radio 1318 may execute various applications or programs stored in the flash memory 1320 and/or the dynamic random access memory (DRAM) 1322. The CPU/Radio 1318 may also receive input from the various hardware and software components, interpret the input, and perform one or more functions in response to the input. As one example, the CPU/Radio 1318 may determine whether the power button 1102 has been pressed, and determines whether the relay 1310 needs to be opened or closed. The CPU/Radio 1318 may further perform all communications functions in order to allow the network device 1100 to communicate with other network devices, one or more gateways, a cloud network, and/or one or more access devices. While the CPU and radio of the network device 1100 are shown to be combined in the CPU/Radio 1318, one of ordinary skill in the art will appreciate that, in some embodiments, the CPU and radio may be separately located within the network device 1100. For example, CPU circuitry may be situated at a separate location on a circuit board from the location of radio circuitry, the CPU circuitry may be located on a different circuit board from the radio circuitry, or the like. Further, the network device 1100 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1100 does not include a cellular network transceiver radio or interface, and thus may not be configured to directly communicate with a cellular network. In some embodiments, the network device 1100 may include a cellular network transceiver radio, and may be configured to communicate with a cellular network using the cellular network transceiver radio.

The network device 1100 may communicate with other devices and/or networks via antenna 1324. For example, antenna 1324 may include a 2.4 GHz antenna, a 5 GHz antenna, or the like, that can transmit and receive WiFi communications signals. The network device 1100 may include other types of antennas that can communicate Bluetooth® signals, Zigbee® signals, Ultra-Wideband (UWB)

signals, WiFi-Direct signals, BLE signals, and/or the like. In some embodiments, the antenna 1324 may be configured to communicate different types of signals, such as the WiFi signals, Bluetooth® signals, Zigbee® signals, UWB signals, WiFi-Direct signals, BLE signals, and/or the like. In some embodiments, the network device 1100 may include multiple antennas for communicating the different types of communication signals. As one example, the network device 1100 may include both a 2.4 GHz antenna and a 5 GHz antenna.

The network device 1100 further includes a driver 1316, a switching power supply 1312, and a voltage regulator 1314. The driver 1316 may include instructions or code that can be used to translate control signals or commands received from applications running on the DRAM 1322 to commands that the various hardware components in the network device 1100 can understand. In some embodiments, the driver 1316 may include an ambient application running on the DRAM 1322. The switching power supply 1312 may be used to transfer power from the outlet in which the plug 1208 is connected to the various loads of the network device 1100 (e.g., CPU/Radio 1318). The switching power supply 1312 may efficiently convert the voltage and current characteristics of the electrical power to a level that is appropriate for the components of the network device 1100. For example, the switching power supply 1312 may perform AC-DC conversion. In some embodiments, the switching power supply 1312 may be used to control the power that is relayed from the plug 1208 to the outlet 1106. The voltage regulator 1314 may be used to convert the voltage output from the switching power supply 1312 to a lower voltage usable by the CPU/Radio 1318. For example, the voltage regulator 1314 may regulate the DC voltage from 5V to 3.3V.

In various embodiments, functions may be stored as one or more computer-program products, such as instructions or code, in a non-transitory machine-readable storage medium, such as the flash memory 1320 and/or the DRAM 1322. The network device 1100 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 1320 and/or the DRAM 1322, may be a processor-readable memory and/or a computer-readable memory that stores software code (programming code, instructions, etc.) configured to cause a processor(s) within the CPU/Radio 1318 to perform the functions described. In other embodiments, one or more of the functions described may be performed in hardware.

A set of these instructions and/or code might be stored on a non-transitory machine-readable storage medium, such as the flash memory 1320 and/or the DRAM 1322. In some cases, the storage medium might be incorporated within a computer system, such as the CPU/Radio 1318. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 1100 and/or might take the form of source and/or installable code, which, upon compilation and/or installation on the network device 1100 (e.g., using compilers, installation programs, compression/decompression utilities, etc.) then takes the form of executable code.

It should be appreciated that the network device 1100 may have other components than those depicted in FIGS. 11-13. Further, the embodiment shown in the figures are only one example of a network device that may incorporate an embodiment of the invention. In some other embodiments, network device 1100 may have more or fewer components than shown in the figure, may combine two or more components, or may have a different configuration or arrangement of components.

Figure 14:
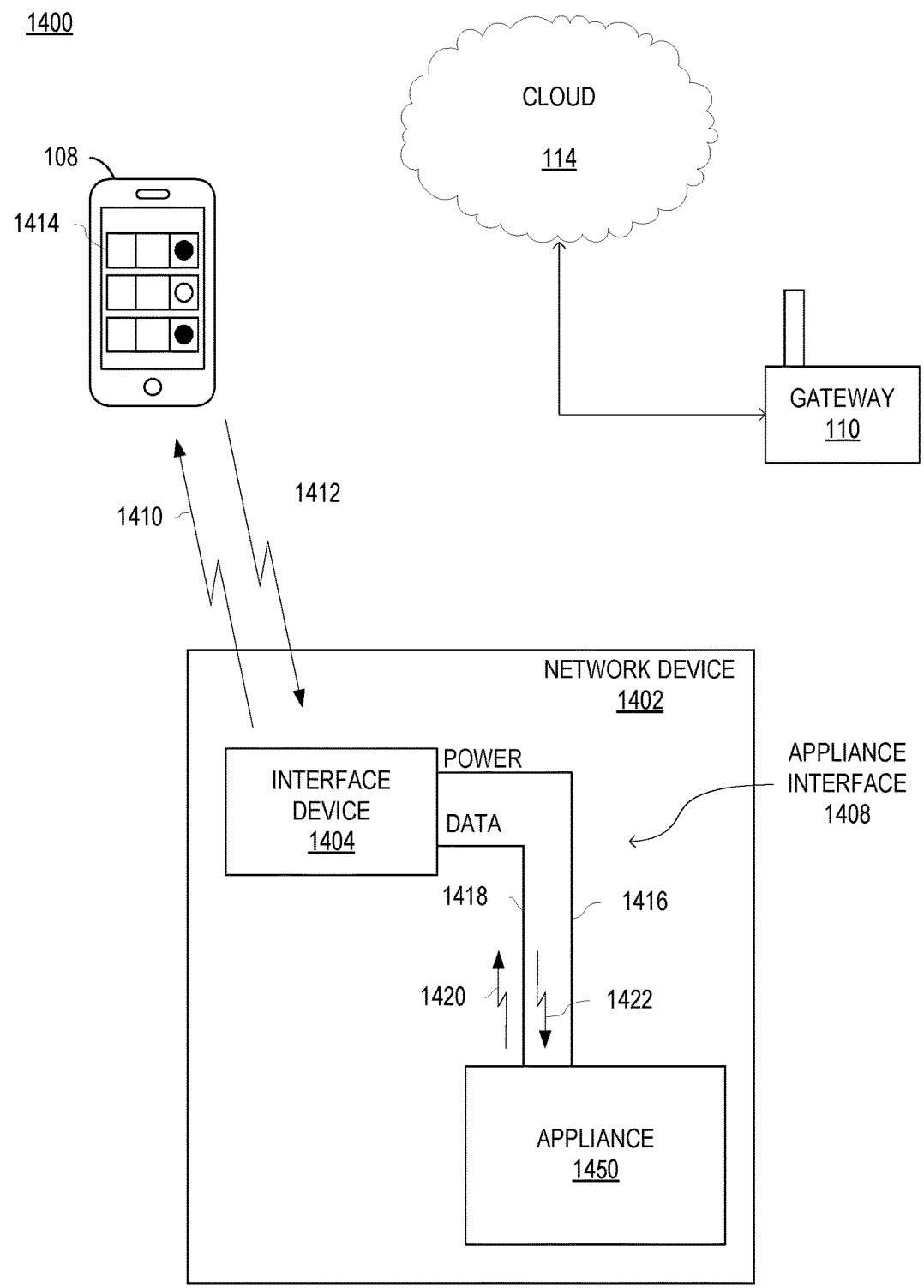
FIG. 14 is a schematic illustration of a local area network including a network device that includes an appliance, in accordance with an embodiment.

FIG. 14 is a schematic illustration of a local area network 1400 including a network device 1402 that includes an appliance 1450. The network device 1402 can comprise an interface device 1404 and the appliance 1450 connected by an appliance interface 1408. The appliance interface 1408 can include a data connection 1418 and a power connection 1416. The data connection 1418 can be a serial connection (e.g., RS-232, USB, or other), or any other suitable data connection. The interface device 1404 can be fully powered by the appliance 1402 through the power connection 1416, or can have a separate source of power.

The appliance 1450 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 1450 can be adapted to operate with the interface device 1404. The appliance 1450 can be any finite state machine. The appliance 1450 can, but need not, know or store one or more states related to the appliance. For example, the appliance 1450 may know or store data related to whether the appliance 1450 is turned on, how long the appliance has been on (or off), among other status data.

The interface device 1404 can be positioned within the housing of the appliance 1450, or can be attached externally to the appliance 1450. The interface device 1404 can be removable from the appliance 1450, or can be permanently installed in or on the appliance 1450.

The interface device 1404 can be connected to the local area network 1400 through a network interface. The interface device 1404 can be connected by a wired or wireless connection (e.g., WiFi, Zigbee, or others described herein or well known). In some embodiments, the interface device 1404 can be connected directly to the cloud network 114 through a cellular internet connection (e.g., EDGE, LTE, or others).

The interface device 1404 can communicate with another network device, an access device 108, or another client device through the network interface 1406. The interface device 1404 can transmit a status information signal 1410 with status information to the access device 108, and the access device 108 can transmit a network device control signal 1412 to the interface device 1404. The status information signal 1410 and the network device control signal 1412 can be transmitted between the interface device 1404 and the access device 108 using a telecommunications network (e.g., a cellular network, or other suitable broadband network), using a local area network 1400 (e.g., through a gateway 110), or using the cloud network 114, although such a signal may pass through an intermediary device or network to do so.

The interface device 1404 can interpret the network device control signal 1412 and perform actions based on the contents of the network device control signal 1412. The network device control signal 1412 can include commands that can be performed by the interface device 1404 itself. The network device control signal 1412 can also include commands that are to be performed by the appliance 1450. Commands that are to be performed by the appliance 1450 can include commands like turn on or off, set a desired temperature (e.g., heat up or cool down to 215° F. or any other temperature), or other suitable commands depending on the particular appliance. The interface device 1404 can interpret the network device control signal 1412 and can send out a command 1422, through the data connection 1418 of the appliance interface 1408, based on the network device control signal 1412. The appliance 1450 can then perform the command indicated in the network device control signal 1412.

The interface device 1404 can also transmit commands to the appliance 1450 that are not based on a network device control signal received from the access device 108, but are rather based on programming in the interface device 1404. Examples of such commands can include commands to update a communication rate, commands to check a state of the appliance 1450, commands to set or get a clock time of the appliance 1450, or any other suitable commands.

The interface device 1404 can receive, through the data connection 1418 of the appliance interface 1408, a response (e.g., response 1420) to any command from the appliance 1450. In some examples, the response 1420 can include an indication that the command 1422 was received. In some examples, the response may include only an indication that a command is received (e.g., an ACK). In some examples, the response 1420 can include information for some value on the appliance 1450, such as an "on/off" state, a serial number, a product identification, a manufacturer identification, a temperature, a time since live, a setting, or any other value retrievable from the appliance 1450. The interface device 1404 can interpret the value and can send information about the value (e.g., the state of the appliance is "on," the temperature of the appliance, the time since the appliance first turned on, or other information) as status information (e.g. using status information signal 1410) to the access device 108. Additionally, the interface device 1404 can send status information about itself (e.g., time since live, supplied power, signal strength, and others) as status information (e.g. using status information signal 1410) to the access device 108.

The interface device 1404 can also use responses (e.g., response 1420) from the appliance 1450 to perform additional functions at the interface device 1404, such as error handling. In some cases, when performing the additional functions, the interface device 1404 does not transmit any status information 1410 to the access device 108 based on those particular responses.

The access device 108 can include one or more display tiles (e.g., display tile 1414) for displaying information and controls corresponding to the network device 102.

In some embodiments, the interface device 1404 can transmit a heartbeat command (e.g., command 1422) over the data connection 1418 to the appliance 1402 to determine whether the appliance 1450 is working properly and/or in a state of readiness. If the interface device 1404 determines that the appliance 1450 has had some sort of failure (e.g., the appliance 1450 sends a response 1420 indicating a failure or the interface device 1404 does not receive any response 1420), the interface device 1404 can take corrective action (e.g., restarting the appliance 1450 or an element of the appliance 1450), can log the event, or can alert the user).

Figure 15:
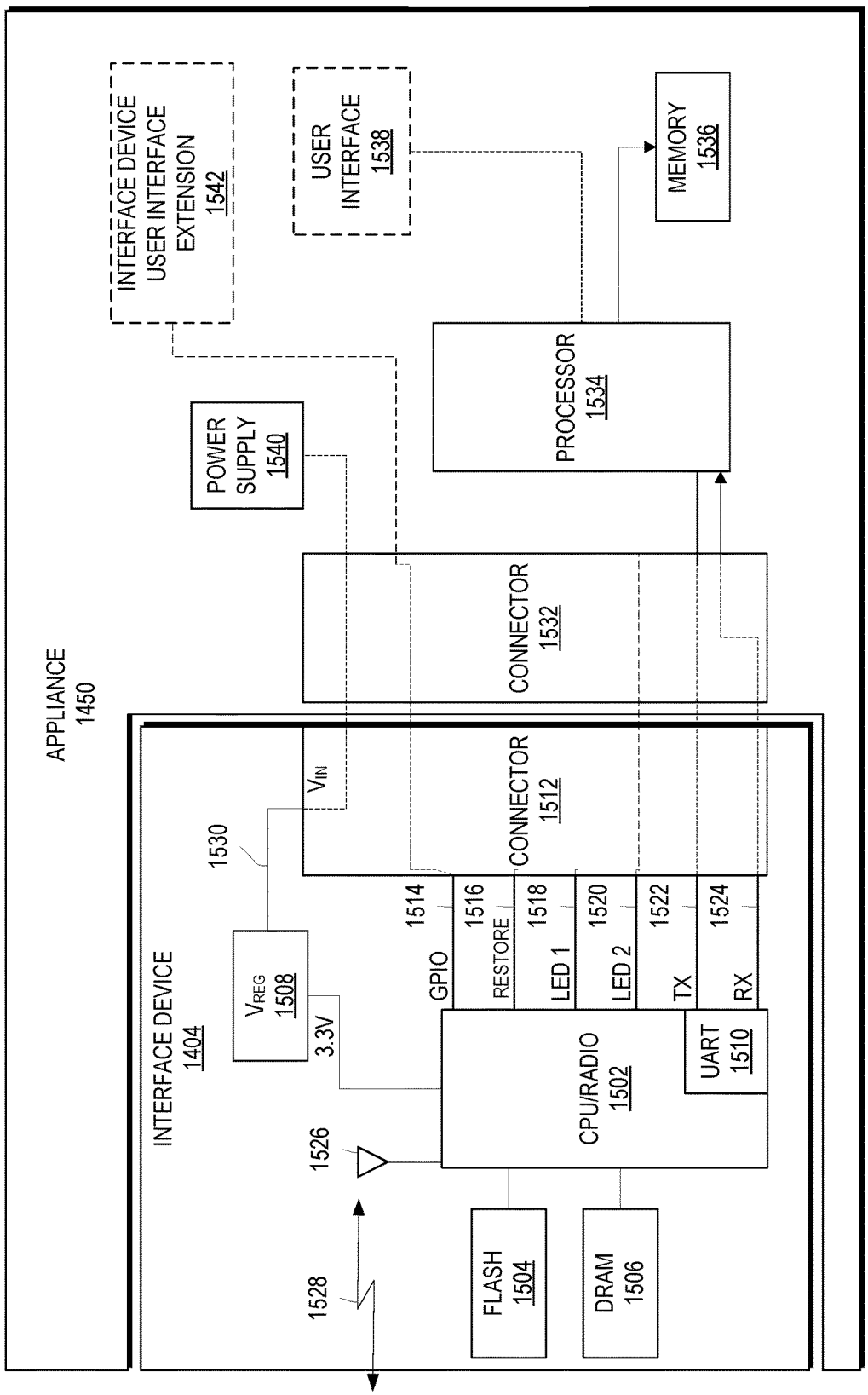
FIG. 15 is an example of a block diagram of a network device including an interface device attached to an appliance, in accordance with an embodiment.

FIG. 15 depicts a block diagram of a network device including an interface device 1404 attached to an appliance 1450 according to one embodiment. The interface device 1404 can include connector 1512 that interacts with connector 1532 of the appliance 1450.

The interface device 1404 can include flash memory 1504 and dynamic random access memory (DRAM) 1506. The flash memory 1504 may be used to store instructions or code relating to an operating system, one or more applications, and any firmware. The flash memory 1504 can be used to store a cache. The flash memory 1504 may include non-volatile memory so that any firmware or other program can be can updated. In the event the interface device 1404 loses power, information stored in the flash memory 1504 may be retained. The DRAM 1506 may store various other types of information needed to run the interface device 1404, such as all runtime instructions or code. The flash memory 1504 or DRAM 1506 or a combination thereof may include all instructions necessary to communicate with an appliance 1450, including all instructions necessary to communicate using the appliance serial protocol disclosed herein.

The interface device 1404 further includes a CPU/Radio 1502. The CPU/Radio 1502 can control the operations of the interface device 1404. For example, the CPU/Radio 1502 may execute various applications or programs stored in the flash memory 1504 and/or the dynamic random access memory (DRAM) 1506. The CPU/Radio 1502 may also receive input from the appliance 1450, interpret the input, and perform one or more functions in response to the input. The CPU/Radio 1502 may further perform all communications functions in order to allow the interface device 1404 to communicate with other network devices, one or more gateways, a cloud network, and/or one or more access devices. The interface device 1404 may communicate with other devices and/or networks via antenna 1526. For example, antenna 1526 may include a 2.4 GHz antenna that can transmit and receive WiFi communications signals 1528. The antenna 1526 may include other types of antennas that can communicate Bluetooth® signals, Zigbee® signals, Ultra-Wideband (UWB) signals, and/or the like. In some embodiments, the interface device 1404 may include multiple antennas for communicating different types of communication signals.

The CPU/Radio 1502 can include at least one universal asynchronous receiver/transmitter (UART) 1510. The CPU/Radio 1403 can use the UART 1510 to send and receive serial communications. The CPU/Radio 1403 can send data through a transmit line 1522 and a receive data through a receive line 1524. The CPU/Radio 1403 can send and receive data through the transmit line 1522 and receive line 1524 using a serial protocol, such as RS232. The CPU/Radio 1502 can also include an input/output (GPIO) line 1514, a restore line 1516, an LED 1 line 1518, and an LED 2 line 1520. The CPU/Radio 1502 can have additional or fewer lines as necessary. The GPIO line 1514 can be used for any suitable function, such as powering an indicator light on an appliance 1450 or accepting an input from the appliance 1450. A signal sent on the restore line 1516 can be used to restore the CPU/Radio 1502 and/or the interface device 1404 to factory defaults. The LED 1 line 1518 and LED 2 line 1520 can be used to power first and second LEDs that can be used to indicate various statuses, such as whether the interface device has a network connection and whether the interface device is powered on.

The interface device 1404 further includes a voltage regulator 1508. The voltage regulator 1508 may be used to convert the voltage output from the appliance 1450 to a voltage usable by the CPU/Radio 1502. For example, the voltage regulator 1508 may regulate the DC voltage from 5V to 3.3V. The voltage regulator 1508 can be supplied with power from a power line 1530.

Each of the interface lines, including the GPIO line 1514, the restore line 1516, the LED 1 line 1518, the LED 2 line 1520, the transmit line 1522, the receive line 1524, the power line 1530, and any additional lines, can be routed through connector 1512. Connector 1512 can be a proprietary or universal connector. Any appliance 1450 to which the interface device 1404 is attached through the connector 1512 can have the necessary hardware to make use of the interface lines, such as to provide power to the power line 1530 and to provide the first and second LEDs that are driven by the LED 1 line 1518 and LED 2 line 1520.

In alternate embodiments, some interface lines are not routed through the connector 1512. For example, the power line 1530 can be routed to a power supply attached directly to the interface device 1404, and the LED 1 line 1518 and LED 2 line 1520 can be routed to first and second LEDs located within the interface device 1404.

In various embodiments, functions may be stored as one or more instructions or code in memory, such as the flash memory 1504 and/or the DRAM 1506. The interface device 1404 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1504 and/or the DRAM 1506, may be a processor-readable memory and/or a computer-readable memory that stores software code (programming code, instructions, etc.) configured to cause a processor(s) within the CPU/Radio 1502 to perform the functions described. In other embodiments, one or more of the functions described may be performed in hardware.

A set of these instructions and/or code might be stored on a computer-readable storage medium, such as the flash memory 1504 and/or the DRAM 1506. In some cases, the storage medium might be incorporated within a computer system, such as the CPU/Radio 1502. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 1404 and/or might take the form of source and/or installable code, which, upon compilation and/or installation on the interface device 1404 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 1404 may have other components than those depicted in FIG. 15. Further, the embodiment shown in the figures are only one example of an interface device that may incorporate an embodiment of the invention. In some other embodiments, interface device 1404 may have more or fewer components than shown in the figure, may combine two or more components, or may have a different configuration or arrangement of components.

The appliance 1450 can have a processor 1534. The processor 1534 can be a microcontroller, such as a Peripheral Interface Controller (PIC). The appliance 1450 can include a memory 1536 (e.g., a flash memory or other) that is readable by the processor 1534. The memory 1536 can include instructions enabling the innate functionality of the appliance 1450, such as heating and timing for a crock pot.

The appliance 1450 can include a user interface 1538. The user interface 1538 can provide buttons, displays, LEDs, knobs, and other input and output elements necessary for a user to interact with the appliance 1450. For example, a user interface 1538 for a slow cooker can include a display, a power button, a temperature adjustment button, and a start button. The user interface 1538 can be driven and/or monitored by the processor 1534. In some embodiments, the appliance 1450 is "headless" or has no user interface 1538.

The appliance 1450 can include a power supply 1540 that can provide power to the voltage regulator 1538 of the interface device 1404 through connector 1532, connector 1512, and power line 1530.

The appliance 1450 can include an interface device user interface extension 1542. The interface device user interface extension 1542 can include various input and output elements that are passed directly to the interface device 1404 without being processed by the processor 1534. Examples of input and output elements of the interface device user interface extension 1542 include LEDs associated with the LED 1 line 1518 and LED 2 line 1520, a hardware restore button associated with the restore line 1516, or any other suitable input/output element.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

Substantial variations may be made in accordance with specific requirements. For example, particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
    establishing, by a computing device, a connection with a local network including a network device;
    establishing, using the connection with the local network, an additional connection with a wide area network;
    receiving, using the additional connection, an identifier associated with the local network and a security key;
    storing, on the computing device, the identifier and the security key;
    terminating the connection, wherein terminating the connection occurs after storing the received identifier and the security key;
    detecting, by the computing device, input corresponding to interaction with an interface of the computing device;
    determining to which network the computing device is connected, wherein networks include the local network and a remote network;
    sending a message to the network device using the local network when it is determined that the computing device is connected to the local network, wherein the message corresponds to an operation of the network device; and
    sending a message to the network device using the remote network when it is determined that the computing device is connected to the remote network, wherein sending the message to the network device using the remote network includes using the identifier and the security key.

2. The method of claim 1, further comprising determining that the computing device has authorization to communicate with the network device on the local network, and wherein determining that the computing device has authorization to communicate with the network device on the local network includes using the security key.

3. The method of claim 1, further comprising determining whether a communication protocol of the computing device supports communication with the network device using the local network, wherein sending the message to the network device using the local network occurs when it is determined that the computing device is connected to the local network and that the communication protocol of the computing device supports communication with the network device using the local network.

4. The method of claim 1, wherein determining that the computing device is connected to the remote network includes:
    determining an identifier associated with the remote network;
    comparing the identifier associated with the remote network to the stored identifier associated with the local network; and
    determining that the identifier associated with the remote network does not match the stored identifier associated with the local network.

5. The method of claim 1, wherein the local network comprises a wireless network, and wherein the remote network comprises a network that is different from the wireless network.

6. The method of claim 1, wherein the message that is sent to the network device using the remote network is encrypted using the security key, the security key facilitating access to the network device on the local network.

7. The method of claim 1, wherein the remote network includes a cloud network in communication with the local network, and wherein sending the message to the network device using the remote network includes sending the message to the cloud network, and wherein the cloud network sends the message received from the computing device to the network device on the local network.

8. The method of claim 1, further comprising:
    in response to sending the message to the network device using the remote network, receiving a response message from the network device using the remote network, wherein the response message corresponds to the operation of the network device.

9. The method of claim 1, further comprising:
    modifying the interface to display a first indication about the operation of the network device when it is determined that the computing device is connected to the local network; and
    modifying the interface to display a second indication about the operation of the network device when it is determined that the computing device is connected to the remote network.

10. The method of claim 1, wherein the input corresponds to controlling the operation of the network device, and wherein the message is sent based on the input.

11. The method of claim 1, wherein the wide area network includes an additional computing device, and wherein the security key is generated by the additional computing device.

12. The method of claim 11, wherein establishing the connection with the local network includes connecting to a gateway of the local network, wherein the identifier is stored on the additional computing device in associate with unique credentials of the gateway, and wherein the message sent to the network device using the remote network, when received by the additional computing device, uses the identifier to direct the message to the gateway of the local network.

13. The method of claim 1, wherein the security key is generated by the network device.

14. A system comprising:
one or more data processors; and
a non-transitory computer-readable storage medium containing instructions which, when executed on the one or more data processors, cause the one or more data processors to perform operations including:
establishing, by a computing device, a connection with a local network including a network device;
establishing, using the connection with the local network, an additional connection with a wide area network;
receiving, using the additional connection, an identifier associated with the local network and a security key;
storing, on the computing device, the identifier and the security key;
terminating the connection, wherein terminating the connection occurs after storing the received identifier and the security key;
detecting input corresponding to interaction with an interface of the computing device;
determining to which network the computing device is connected, wherein networks include the local network and
a remote network;
sending a message to the network device using the local network when it is determined that the computing device is connected to the local network, wherein the message corresponds to an operation of the network device; and
sending the message to the network device using the remote network when it is determined that the computing device is connected to the remote network, wherein sending the message to the network device using the remote network includes using the identifier and the security key.

15. The system of claim 14, wherein the operations further comprise determining that the computing device has authorization to communicate with the network device on the local network, and wherein determining that the computing device has authorization to communicate with the network device on the local network includes using the security key.

16. The system of claim 14, wherein the operations further comprise determining whether a communication protocol of the computing device supports communication with the network device using the local network, wherein sending the message to the network device using the local network occurs when it is determined that the computing device is connected to the local network and that the communication protocol of the computing device supports communication with the network device using the local network.

17. The system of claim 14, wherein determining that the computing device is connected to the remote network includes:
determining an identifier associated with the remote network;
comparing the identifier associated with the remote network to the stored identifier associated with the local network; and
determining that the identifier associated with the remote network does not match the stored identifier associated with the local network.

18. The system of claim 14, wherein the local network comprises a wireless network, and wherein the remote network comprises a network that is different from the wireless network.

19. The system of claim 14, wherein the message that is sent to the network device using the remote network is encrypted using the security key, the security key facilitating access to the network device on the local network.

20. The system of claim 14, wherein the remote network includes a cloud network in communication with the local network, and wherein sending the message to the network device using the remote network includes sending the message to the cloud network, and wherein the cloud network sends the message received from the computing device to the network device on the local network.

21. The system of claim 14, wherein the operations further comprise:
in response to sending the message to the network device using the remote network, receiving a response message from the network device using the remote network, wherein the response message corresponds to the operation of the network device.

22. The system of claim 14, wherein the operations further comprise:
modifying the interface to display a first indication about the operation of the network device when it is determined that the computing device is connected to the local network; and
modifying the interface to display a second indication about the operation of the network device when it is determined that the computing device is connected to the remote network.

23. The system of claim 14, wherein the input corresponds to controlling the operation of the network device, and wherein the message is sent based on the input.

24. The system of claim 14, wherein the wide area network includes an additional computing device, and wherein the security key is generated by the additional computing device.

25. The system of claim 24, wherein establishing the connection with the local network includes connecting to a gateway of the local network, wherein the identifier is stored on the additional computing device in associate with unique credentials of the gateway, and wherein the message sent to the network device using the remote network, when received by the additional computing device, uses the identifier to direct the message to the gateway of the local network.

26. The system of claim 14, wherein the security key is generated by the network device.

27. A computer-program product tangibly embodied in a non-transitory machine-readable storage medium, including instructions configured to cause a data processing apparatus to perform operations including:
establishing, by a computing device, a connection with a local network including a network device;
establishing, using the connection with the local network, an additional connection with a wide area network;
receiving, using the additional connection, an identifier associated with the local network and a security key;
storing, on the computing device, the identifier and the security key;

terminating the connection, wherein terminating the connection occurs after storing the received identifier and the security key;

detecting, by a computing device, input corresponding to interaction with an interface of the computing device;

determining to which network the computing device is connected, wherein networks include the local network and a remote network;

sending a message to the network device using the local network when it is determined that the computing device is connected to the local network, wherein the message corresponds to an operation of the network device; and send the message to the network device using the remote network based on determining that the computing device is connected to the remote network.

28. The computer-program product of claim 27, wherein the operations further comprise determining that the computing device has authorization to communicate with the network device on the local network, and wherein determining that the computing device has authorization to communicate with the network device on the local network includes using the security key.

29. The computer-program product of claim 27, wherein the operations further comprise determining whether a communication protocol of the computing device supports communication with the network device using the local network, wherein sending the message to the network device using the local network occurs when it is determined that the computing device is connected to the local network and that the communication protocol of the computing device supports communication with the network device using the local network.

30. The computer-program product of claim 27, wherein determining that the computing device is connected to the remote network includes:

determining an identifier associated with the remote network;

comparing the identifier associated with the remote network to the stored identifier associated with the local network; and determining that the identifier associated with the remote network does not match the stored identifier associated with the local network.

31. The computer-program product of claim 27, wherein the local network comprises a wireless network, and wherein the remote network comprises a network that is different from the wireless network.

32. The computer-program product of claim 27, wherein the message that is sent to the network device using the remote network is encrypted using the security key, the security key facilitating access to the network device on the local network.

33. The computer-program product of claim 27, wherein the remote network includes a cloud network in communication with the local network, and wherein sending the message to the network device using the remote network includes sending the message to the cloud network, and wherein the cloud network sends the message received from the computing device to the network device on the local network.

34. The computer-program product of claim 27, wherein the operations further comprise:

in response to sending the message to the network device using the remote network, receiving a response message from the network device using the remote network, wherein the response message corresponds to the operation of the network device.

35. The computer-program product of claim 27, wherein the operations further comprise:

modifying the interface to display a first indication about the operation of the network device when it is determined that the computing device is connected to the local network; and modifying the interface to display a second indication about the operation of the network device when it is determined that the computing device is connected to the remote network.

36. The computer-program product of claim 27, wherein the input corresponds to controlling the operation of the network device, and wherein the message is sent based on the input.

37. The computer-program product of claim 27, wherein the wide area network includes an additional computing device, and wherein the security key is generated by the additional computing device.

38. The computer-program product of claim 37, wherein establishing the connection with the local network includes connecting to a gateway of the local network, wherein the identifier is stored on the additional computing device in associate with unique credentials of the gateway, and wherein the message sent to the network device using the remote network, when received by the additional computing device, uses the identifier to direct the message to the gateway of the local network.

39. The computer-program product of claim 27, wherein the security key is generated by the network device.

* * * * *